US012140690B2

(12) United States Patent
Blomqvist

(10) Patent No.: US 12,140,690 B2
(45) Date of Patent: Nov. 12, 2024

(54) POSITIONING USING LOCALLY UNIQUE NEIGHBOR CELL IDENTIFIERS

(71) Applicant: HERE Global B.V., Eindhoven (NL)

(72) Inventor: Mikko Juhani Blomqvist, Lempaeaelae (FI)

(73) Assignee: HERE GLOBAL B.V., Eindhoven (NL)

(*) Notice: Subject to any disclaimer, the term of this patent is extended or adjusted under 35 U.S.C. 154(b) by 413 days.

(21) Appl. No.: 17/645,148

(22) Filed: Dec. 20, 2021

(65) Prior Publication Data

US 2023/0194650 A1    Jun. 22, 2023

(51) Int. Cl.
G01S 5/02 (2010.01)

(52) U.S. Cl.
CPC ...... G01S 5/02523 (2020.05); G01S 5/02528 (2020.05); G01S 5/0284 (2013.01)

(58) Field of Classification Search
CPC ............ G01S 5/02523; G01S 5/02528; G01S 5/0284; G01S 5/02529; G01S 5/02524
See application file for complete search history.

(56) References Cited

U.S. PATENT DOCUMENTS

| 8,712,430 | B2 * | 4/2014 | Tang | H04W 24/02 |
| | | | | 455/226.1 |
| 9,232,492 | B2 * | 1/2016 | Oka | G01S 5/0252 |
| 2009/0132674 | A1 * | 5/2009 | Horn | H04W 36/0061 |
| | | | | 709/227 |
| 2011/0070897 | A1 * | 3/2011 | Tang | H04W 24/02 |
| | | | | 455/466 |
| 2014/0243010 | A1 * | 8/2014 | Oka | H04W 64/00 |
| | | | | 455/456.1 |
| 2017/0339012 | A1 * | 11/2017 | He | H04L 41/0803 |
| 2019/0246342 | A1 * | 8/2019 | Wang | H04W 8/08 |
| 2021/0223354 | A1 * | 7/2021 | Breuer | G01S 5/02216 |
| 2021/0270930 | A1 * | 9/2021 | Mohammadi | G01S 5/009 |

FOREIGN PATENT DOCUMENTS

CN     108474833 A     8/2018

* cited by examiner

Primary Examiner — Kenneth T Lam
(74) Attorney, Agent, or Firm — Jason Wejnert; HERE GLOBAL B.V.

(57) ABSTRACT

Various embodiments relate to the generation and/or use of a positioning map comprising instances of neighbor-cell information that each comprising, are associated with, and/or indexed by a respective globally unique identifier. In an example embodiment, a processor determines a locally unique identifier and an estimated location of an observed neighbor cell. The processor defines a globally unique identifier for the neighbor cell comprising the locally unique identifier and an indication of the estimated location of the neighbor cell. The processor generates a positioning map to include an instance of neighbor-cell information corresponding to the neighbor cell. The instance of neighbor-cell information comprises, is associated with, and/or is indexed by the defined globally unique identifier. The instance of neighbor-cell information may be accessed via an observed locally unique identifier when determining a position estimate for a computing entity that observed a neighbor cell corresponding to the observed locally unique identifier.

9 Claims, 7 Drawing Sheets

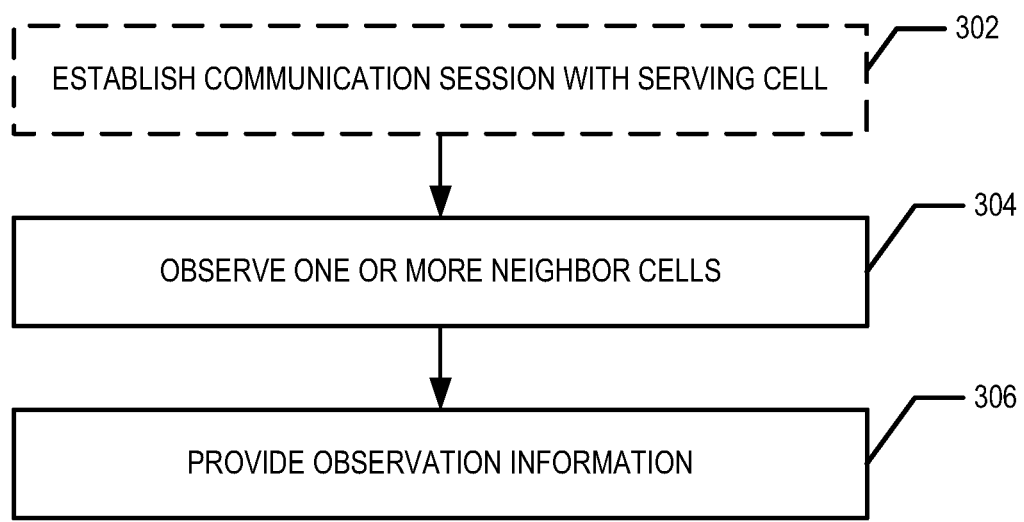

POSITIONING USING LOCALLY UNIQUE NEIGHBOR CELL IDENTIFIERS

TECHNOLOGICAL FIELD

An example embodiment relates to generating a positioning map that includes globally unique identifiers for neighbor cells. An example embodiment relates to using a positioning map that includes globally unique identifiers for neighbor cells to determine a position estimate.

BACKGROUND

In various scenarios, a mobile device or computing entity may be in communication with a serving cell of a communications network (e.g., a cellular communications network). The mobile device or computing entity may receive a globally unique identifier for the serving cell. The mobile device or computing entity may also observe one or more neighbor cells of one or more communications networks (e.g., cellular communications networks), but may not have access to globally unique identifiers for the neighbor cells. Conventional neighbor cell positioning divides serving cell coverage areas into smaller neighbor cell coverage areas such that information relating to the neighbor cells is stored hierarchically under the serving cell information. Therefore, if a neighbor cell may be observed in four different serving cell coverage areas, four different instances of information relating to the neighbor cell are stored, with each instance stored in association with a different serving cell. This means that neighbor cell radio maps are large in size vice and most of the neighbor cell information is redundant. These radio maps are generally communicated via bandwidth-limited networks and portions of the radio maps may be stored by memory-limited mobile devices for use in offline positioning, for example.

BRIEF SUMMARY

Various embodiments provide methods, apparatus, systems, and computer program products for generating and/or using a positioning map comprising instances neighbor-cell information in association with respective globally unique identifiers. For example, the positioning map is generated (e.g., created, updated, and/or the like) to include only one instance of neighbor-cell information corresponding to a particular neighbor cell. For example, for each neighbor cell for which an instance of neighbor-cell information is included in the positioning map, there is only one instance of neighbor-cell information corresponding to that neighbor cell. For example, the positioning map is configured to not include duplicate instances of neighbor-cell information.

For example, in various embodiments, a mobile device may observe a neighbor cell. As used herein, a mobile device (or computing entity) observes a neighbor cell by receiving, measuring, and/or observing a signal generated and/or transmitted by the neighbor cell. The mobile device may provide observation information corresponding to the mobile device's observation of the neighbor cell. Based on the observation information, a network device or the mobile device may determine a locally unique identifier for the neighbor cell. For example, the locally unique identifier may comprise information that is available to the mobile device based on the observation of the neighbor cell. For example, the locally unique identifier may comprise one or more operational parameters for the neighbor cell. The network device or mobile device may further determine an estimated location of the neighbor cell. A globally unique identifier for the neighbor cell may be defined by concatenating the locally unique identifier and the estimated location of the neighbor cell. A positioning map may be generated (e.g., created, updated, and/or the like) to include an instance of neighbor-cell information corresponding to the neighbor cell and comprising, associated with, and/or indexed by the globally unique identifier defined for the neighbor cell.

For example, in various embodiments, a computing entity may observe an observed neighbor cell. The computing entity may provide observation information corresponding to the computing entity's observation of the observed neighbor cell. A network device or the computing entity may obtain (e.g., determined based on the observation information) an observed locally unique identifier for the observed neighbor cell. Based on the observed locally unique identifier, a particular instance of neighbor-cell information is identified from a plurality of instances neighbor-cell information that are comprising, associated with, and/or indexed by globally unique identifiers that comprise locally unique identifiers that match the observed locally unique identifier. The particular instance of neighbor-cell information is identified from the plurality of instances neighbor-cell information that are comprising, associated with, and/or indexed by globally unique identifiers that comprise locally unique identifiers that match the observed locally unique identifier based at least in part on the estimated location associated with the particular instance of neighbor-cell information. A position estimate is then determined for the computing entity based at least in part on the particular instance of neighbor-cell information. The position estimate may be provided to the computing entity, used to perform an positioning and/or navigation-related function, and/or the like.

In an example embodiment, a processor determines (a) a locally unique identifier for a neighbor cell observed by a mobile device and (b) an estimated location of the neighbor cell. The processor defines a globally unique identifier for the neighbor cell. the defined globally unique identifier comprises the locally unique identifier of the neighbor cell and an indication of the estimated location of the neighbor cell. The processor generates a positioning map to include an instance of neighbor-cell information corresponding to the neighbor cell. The neighbor-cell information comprises at least the defined globally unique identifier.

In an example embodiment, a processor obtains an observed locally unique identifier for an observed neighbor cell. The processor has access to at least a portion of a positioning map that comprises a plurality of instances of neighbor-cell information. Each instance of neighbor-cell information comprises a respective globally unique identifier configured to uniquely identify a corresponding neighbor cell in the positioning map. The respective globally unique identifier comprises a respective locally unique identifier of the corresponding neighbor cell and a respective indication of a respective estimated location of the corresponding neighbor cell. The processor identifies a particular instance of neighbor-cell information that is associated with the observed neighbor cell. The particular instance of neighbor-cell information is identified from among the plurality of instances of neighbor-cell information within the at least a portion of the positioning map. Identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance. The processor determines a position estimate based at least in part on the identified particular instance of neighbor-cell information that is associated with the observed neighbor cell.

In one aspect of the present disclosure, a method for preventing data duplication associated with neighbor cells in a positioning map is provided. In an example embodiment, the method comprises determining, by a processor, (a) a locally unique identifier for a neighbor cell observed by a mobile device and (b) an estimated location of the neighbor cell. The method further comprises defining, by the processor, a globally unique identifier for the neighbor cell. The defined globally unique identifier comprises the locally unique identifier of the neighbor cell and an indication of the estimated location of the neighbor cell. The method further comprises generating, by the processor, a positioning map to include an instance of neighbor-cell information corresponding to the neighbor cell. The neighbor-cell information comprises at least the defined globally unique identifier.

In an example embodiment, the positioning map is updated to include at most one instance of neighbor cell information for the neighbor cell. In an example embodiment, the neighbor-cell information comprises the estimated location for the neighbor cell. In an example embodiment, the positioning map is configured to be used to determine a position estimate for a computing entity based on one or more neighbor cells observed by the computing entity. In an example embodiment, the locally unique identifier for the neighbor cell comprises operational parameters of the neighbor cell. In an example embodiment, at least one of (a) the neighbor cell is configured to communicate via long-term evolution (LTE) wireless broadband communications and the locally unique identifier for the neighbor cell comprises physical cell ID (PCI) and E-UTRA Absolute Radio Frequency Channel Number (EARFCN) values for the neighbor cell; (b) the neighbor cell is configured to communicate via Wideband Code Division Multiple Access (WCDMA) wireless broadband communications and the locally unique identifier for the neighbor cell comprises primary scrambling code (PSC) and UTRA Absolute Radio Frequency Channel Number (UARFCN) values for the neighbor cell; (c) the neighbor cell is configured to communicate via global system for mobile communications (GSM) wireless broadband communications and the locally unique identifier for the neighbor cell comprises base station identity code (BSIC) and Absolute Radio Frequency Channel Number (ARFCN) values for the neighbor cell; or (d) the neighbor cell is configured to communicate via 5G wireless broadband communications and the locally unique identifier for the neighbor cell comprises PCI and New Radio Absolute Radio Frequency Channel Number (NR-ARFCN) values for the neighbor cell.

In an example embodiment, the estimated location of the neighbor cell is determined based at least in part on at least one of (a) a globally unique identifier for a serving cell in communication with the mobile device when the mobile device observed the neighbor cell; (b) a GNSS-based position estimate of the mobile device corresponding to when the mobile device observed the neighbor cell; or (c) a radio map-based position estimate of the mobile device corresponding to when the mobile device observed the neighbor cell. In an example embodiment, the estimated location of the neighbor cell comprises at least one of (a) estimated longitude and latitude values of the estimated location; or (b) an indicator of a geographic region corresponding to the estimated location. In an example embodiment, a geographic region corresponding to the estimated location of the neighbor cell has a granularity such that the locally unique identifier of the neighbor cell is unique within the geographic region. In an example embodiment, determining the estimated location for the neighbor cell comprises using a clustering algorithm. In an example embodiment, the method further comprises providing the positioning map such that a computing entity receives the positioning map, the computing entity configured to use the positioning map to perform a positioning and/or navigation-related function.

According to another aspect of the present disclosure, an apparatus is provided. In an example embodiment, the apparatus comprises at least one processor, at least one memory storing computer program code, and a communications interface. The at least one memory and the computer program code are configured to, with the processor, cause the apparatus to at least determine (a) a locally unique identifier for a neighbor cell observed by a mobile device and (b) an estimated location of the neighbor cell; and define a globally unique identifier for the neighbor cell. The defined globally unique identifier comprises the locally unique identifier of the neighbor cell and an indication of the estimated location of the neighbor cell. The at least one memory and the computer program code are further configured to, with the processor, cause the apparatus to at least generate a positioning map to include an instance of neighbor-cell information corresponding to the neighbor cell. The neighbor-cell information comprises at least the defined globally unique identifier.

In an example embodiment, the positioning map is updated to include at most one instance of neighbor cell information for the neighbor cell. In an example embodiment, the neighbor-cell information comprises the estimated location for the neighbor cell. In an example embodiment, the positioning map is configured to be used to determine a position estimate for a computing entity based on one or more neighbor cells observed by the computing entity. In an example embodiment, the locally unique identifier for the neighbor cell comprises operational parameters of the neighbor cell. In an example embodiment, at least one of (a) the neighbor cell is configured to communicate via long-term evolution (LTE) wireless broadband communications and the locally unique identifier for the neighbor cell comprises physical cell ID (PCI) and E-UTRA Absolute Radio Frequency Channel Number (EARFCN) values for the neighbor cell; (b) the neighbor cell is configured to communicate via Wideband Code Division Multiple Access (WCDMA) wireless broadband communications and the locally unique identifier for the neighbor cell comprises primary scrambling code (PSC) and UTRA Absolute Radio Frequency Channel Number (UARFCN) values for the neighbor cell; (c) the neighbor cell is configured to communicate via global system for mobile communications (GSM) wireless broadband communications and the locally unique identifier for the neighbor cell comprises base station identity code (BSIC) and Absolute Radio Frequency Channel Number (ARFCN) values for the neighbor cell; or (d) the neighbor cell is configured to communicate via 5G wireless broadband communications and the locally unique identifier for the neighbor cell comprises PCI and New Radio Absolute Radio Frequency Channel Number (NR-ARFCN) values for the neighbor cell.

In an example embodiment, the estimated location of the neighbor cell is determined based at least in part on at least one of (a) a globally unique identifier for a serving cell in communication with the mobile device when the mobile device observed the neighbor cell; (b) a GNSS-based position estimate of the mobile device corresponding to when the mobile device observed the neighbor cell; or (c) a radio map-based position estimate of the mobile device corresponding to when the mobile device observed the neighbor cell. In an example embodiment, the estimated location of the neighbor cell comprises at least one of (a) estimated longitude and latitude values of the estimated location; or (b) an indicator of a geographic region corresponding to the estimated location. In an example embodiment, a geographic region corresponding to the estimated location of the neighbor cell has a granularity such that the locally unique identifier of the neighbor cell is unique within the geographic region. In an example embodiment, determining the estimated location for the neighbor cell comprises using a clustering algorithm. In an example embodiment, the at least one memory and the computer program code are further configured to, with the processor, cause the apparatus to at least provide the positioning map such that a computing entity receives the positioning map, the computing entity configured to use the positioning map to perform a positioning and/or navigation-related function.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to determine (a) a locally unique identifier for a neighbor cell observed by a mobile device and (b) an estimated location of the neighbor cell; and define a globally unique identifier for the neighbor cell. The defined globally unique identifier comprises the locally unique identifier of the neighbor cell and an indication of the estimated location of the neighbor cell. The computer-readable program code portions further comprise executable portions configured, when executed by a processor of an apparatus, to cause the apparatus to generate a positioning map to include an instance of neighbor-cell information corresponding to the neighbor cell. The neighbor-cell information comprises at least the defined globally unique identifier.

In an example embodiment, the positioning map is updated to include at most one instance of neighbor cell information for the neighbor cell. In an example embodiment, the neighbor-cell information comprises the estimated location for the neighbor cell. In an example embodiment, the positioning map is configured to be used to determine a position estimate for a computing entity based on one or more neighbor cells observed by the computing entity. In an example embodiment, the locally unique identifier for the neighbor cell comprises operational parameters of the neighbor cell. In an example embodiment, at least one of (a) the neighbor cell is configured to communicate via long-term evolution (LTE) wireless broadband communications and the locally unique identifier for the neighbor cell comprises physical cell ID (PCI) and E-UTRA Absolute Radio Frequency Channel Number (EARFCN) values for the neighbor cell; (b) the neighbor cell is configured to communicate via Wideband Code Division Multiple Access (WCDMA) wireless broadband communications and the locally unique identifier for the neighbor cell comprises primary scrambling code (PSC) and UTRA Absolute Radio Frequency Channel Number (UARFCN) values for the neighbor cell; (c) the neighbor cell is configured to communicate via global system for mobile communications (GSM) wireless broadband communications and the locally unique identifier for the neighbor cell comprises base station identity code (BSIC) and Absolute Radio Frequency Channel Number (ARFCN) values for the neighbor cell; or (d) the neighbor cell is configured to communicate via 5G wireless broadband communications and the locally unique identifier for the neighbor cell comprises PCI and New Radio Absolute Radio Frequency Channel Number (NR-ARFCN) values for the neighbor cell.

In an example embodiment, the estimated location of the neighbor cell is determined based at least in part on at least one of (a) a globally unique identifier for a serving cell in communication with the mobile device when the mobile device observed the neighbor cell; (b) a GNSS-based position estimate of the mobile device corresponding to when the mobile device observed the neighbor cell; or (c) a radio map-based position estimate of the mobile device corresponding to when the mobile device observed the neighbor cell. In an example embodiment, the estimated location of the neighbor cell comprises at least one of (a) estimated longitude and latitude values of the estimated location; or (b) an indicator of a geographic region corresponding to the estimated location. In an example embodiment, a geographic region corresponding to the estimated location of the neighbor cell has a granularity such that the locally unique identifier of the neighbor cell is unique within the geographic region. In an example embodiment, determining the estimated location for the neighbor cell comprises using a clustering algorithm. In an example embodiment, the computer-readable program code portions comprise executable portions further configured, when executed by a processor of an apparatus, to cause the apparatus to provide the positioning map such that a computing entity receives the positioning map, the computing entity configured to use the positioning map to perform a positioning and/or navigation-related function.

According to yet another aspect of the present disclosure, an apparatus is provided. In an example embodiment, the apparatus comprises means for determining (a) a locally unique identifier for a neighbor cell observed by a mobile device and (b) an estimated location of the neighbor cell. The apparatus comprises means for defining a globally unique identifier for the neighbor cell. The defined globally unique identifier comprises the locally unique identifier of the neighbor cell and an indication of the estimated location of the neighbor cell. The apparatus comprises means for generating a positioning map to include an instance of neighbor-cell information corresponding to the neighbor cell. The neighbor-cell information comprises at least the defined globally unique identifier.

According to an aspect of the present disclosure, a method for determining a position estimate using at least a portion of a positioning map comprising instances of neighbor-cell information comprising, associated with, and/or indexed by globally unique identifiers. In an example embodiment, the method comprises obtaining, by a processor, an observed locally unique identifier for an observed neighbor cell. The processor has access to at least a portion of a positioning map that comprises a plurality of instances of neighbor-cell information. Each instance of neighbor-cell information comprises a respective globally unique identifier configured to uniquely identify a corresponding neighbor cell in the positioning map. The respective globally unique identifier comprises a respective locally unique identifier of the corresponding neighbor cell and a respective indication of a respective estimated location of the corresponding neighbor cell. The method further comprises identifying, by the processor, a particular instance of neighbor-cell information that is associated with the observed neighbor cell. The particular instance of neighbor-cell information is identified from among the plurality of instances of neighbor-cell information within the at least a portion of the positioning map. Identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance. The method further comprises determining, by the processor, a position estimate based at least in part on the identified particular instance of neighbor-cell information that is associated with the observed neighbor cell.

In an example embodiment, the position estimate is determined for a computing entity that observed the observed neighbor cell. In an example embodiment, an indication of an approximate location of the computing entity corresponding to a time at which the computing entity observed the observed neighbor cell is obtained by the processor, and the method further comprises filtering one or more globally unique identifiers comprising locally unique identifiers that match the observed locally unique identifier based on estimated locations associated with the one or more globally unique identifiers and the approximate location of the computing entity, wherein the identifying of the globally unique identifier is performed after the filtering of the one or more globally unique identifiers comprising locally unique identifiers that match the observed locally unique identifier. In an example embodiment, the indication of the approximate location of the computing entity is determined based at least in part on at least one of (a) a globally unique identifier for a serving cell in communication with the computing entity when the computing entity observed the observed neighbor cell; (b) a GNSS-based position estimate of the computing entity corresponding to when the computing entity observed the observed neighbor cell; or (c) a radio map-based position estimate of the computing entity corresponding to when the computing entity observed the observed neighbor cell. In an example embodiment, the observed locally unique identifier for the observed neighbor cell comprises operational parameters of the observed neighbor cell. In an example embodiment, at least one of (a) the observed neighbor cell is configured to communicate via long-term evolution (LTE) wireless broadband communications and the locally unique identifier for the observed neighbor cell comprises physical cell ID (PCI) and E-UTRA Absolute Radio Frequency Channel Number (EARFCN) values for the observed neighbor cell; (b) the observed neighbor cell is configured to communicate via Wideband Code Division Multiple Access (WCDMA) wireless broadband communications and the locally unique identifier for the observed neighbor cell comprises primary scrambling code (PSC) and UTRA Absolute Radio Frequency Channel Number (UARFCN) values for the observed neighbor cell; (c) the observed neighbor cell is configured to communicate via global system for mobile communications (GSM) wireless broadband communications and the locally unique identifier for the observed neighbor cell comprises base station identity code (BSIC) and Absolute Radio Frequency Channel Number (ARFCN) values for the observed neighbor cell; or (d) the observed neighbor cell is configured to communicate via 5G wireless broadband communications and the locally unique identifier for the observed neighbor cell comprises PCI and New Radio Absolute Radio Frequency Channel Number (NR-ARFCN) values for the observed neighbor cell. In an example embodiment, the plurality of instances of neighbor-cell information each correspond to a unique neighbor cell. In an example embodiment, identifying the particular instance of neighbor-cell information comprises using a clustering algorithm to identify geographically-related clusters of neighbor cells based on the approximate locations of the neighbor cells associated with corresponding globally unique identifiers.

According to another aspect of the present disclosure, an apparatus is provided. In an example embodiment, the apparatus comprises at least one processor, at least one memory storing computer program code, and a communications interface. The at least one memory and the computer program code are configured to, with the processor, cause the apparatus to at least obtain an observed locally unique identifier for an observed neighbor cell. The processor has access to at least a portion of a positioning map that comprises a plurality of instances of neighbor-cell information. Each instance of neighbor-cell information comprises a respective globally unique identifier configured to uniquely identify a corresponding neighbor cell in the positioning map. The respective globally unique identifier comprises a respective locally unique identifier of the corresponding neighbor cell and a respective indication of a respective estimated location of the corresponding neighbor cell. The at least one memory and the computer program code are further configured to, with the processor, cause the apparatus to at least identify a particular instance of neighbor-cell information that is associated with the observed neighbor cell. The particular instance of neighbor-cell information is identified from among the plurality of instances of neighbor-cell information within the at least a portion of the positioning map. Identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance. The at least one memory and the computer program code are further configured to, with the processor, cause the apparatus to at least determine a position estimate based at least in part on the identified particular instance of neighbor-cell information that is associated with the observed neighbor cell.

In an example embodiment, the position estimate is determined for a computing entity that observed the observed neighbor cell. In an example embodiment, an indication of an approximate location of the computing entity corresponding to a time at which the computing entity observed the observed neighbor cell is obtained by the processor, and the method further comprises filtering one or more globally unique identifiers comprising locally unique identifiers that match the observed locally unique identifier based on estimated locations associated with the one or more globally unique identifiers and the approximate location of the computing entity, wherein the identifying of the globally unique identifier is performed after the filtering of the one or more globally unique identifiers comprising locally unique identifiers that match the observed locally unique identifier. In an example embodiment, the indication of the approximate location of the computing entity is determined based at least in part on at least one of (a) a globally unique identifier for a serving cell in communication with the computing entity when the computing entity observed the observed neighbor cell; (b) a GNSS-based position estimate of the computing entity corresponding to when the computing entity observed the observed neighbor cell; or (c) a radio map-based position estimate of the computing entity corresponding to when the computing entity observed the observed neighbor cell. In an example embodiment, the observed locally unique identifier for the observed neighbor cell comprises operational parameters of the observed neighbor cell. In an example embodiment, at least one of (a) the observed neighbor cell is configured to communicate via long-term evolution (LTE) wireless broadband communications and the locally unique identifier for the observed neighbor cell comprises physical cell ID (PCI) and E-UTRA Absolute Radio Frequency Channel Number (EARFCN) values for the observed neighbor cell; (b) the observed neighbor cell is configured to communicate via Wideband Code Division Multiple Access (WCDMA) wireless broadband communications and the locally unique identifier for the observed neighbor cell comprises primary scrambling code (PSC) and UTRA Absolute Radio Frequency Channel Number (UARFCN) values for the observed neighbor cell; (c) the observed neighbor cell is configured to communicate via global system for mobile communications (GSM) wireless broadband communications and the locally unique identifier for the observed neighbor cell comprises base station identity code (BSIC) and Absolute Radio Frequency Channel Number (ARFCN) values for the observed neighbor cell; or (d) the observed neighbor cell is configured to communicate via 5G wireless broadband communications and the locally unique identifier for the observed neighbor cell comprises PCI and New Radio Absolute Radio Frequency Channel Number (NR-ARFCN) values for the observed neighbor cell. In an example embodiment, the plurality of instances of neighbor-cell information each correspond to a unique neighbor cell. In an example embodiment, identifying the particular instance of neighbor-cell information comprises using a clustering algorithm to identify geographically-related clusters of neighbor cells based on the approximate locations of the neighbor cells associated with corresponding globally unique identifiers.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to obtain an observed locally unique identifier for an observed neighbor cell. The processor has access to at least a portion of a positioning map that comprises a plurality of instances of neighbor-cell information. Each instance of neighbor-cell information comprises a respective globally unique identifier configured to uniquely identify a corresponding neighbor cell in the positioning map. The respective globally unique identifier comprises a respective locally unique identifier of the corresponding neighbor cell and a respective indication of a respective estimated location of the corresponding neighbor cell. The computer-readable program code portions comprise executable portions further configured, when executed by a processor of an apparatus, to cause the apparatus to identify a particular instance of neighbor-cell information that is associated with the observed neighbor cell. The particular instance of neighbor-cell information is identified from among the plurality of instances of neighbor-cell information within the at least a portion of the positioning map. Identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance. The computer-readable program code portions comprise executable portions further configured, when executed by a processor of an apparatus, to cause the apparatus to determine a position estimate based at least in part on the identified particular instance of neighbor-cell information that is associated with the observed neighbor cell.

In an example embodiment, the position estimate is determined for a computing entity that observed the observed neighbor cell. In an example embodiment, an indication of an approximate location of the computing entity corresponding to a time at which the computing entity observed the observed neighbor cell is obtained by the processor, and the method further comprises filtering one or more globally unique identifiers comprising locally unique identifiers that match the observed locally unique identifier based on estimated locations associated with the one or more globally unique identifiers and the approximate location of the computing entity, wherein the identifying of the globally unique identifier is performed after the filtering of the one or more globally unique identifiers comprising locally unique identifiers that match the observed locally unique identifier. In an example embodiment, the indication of the approximate location of the computing entity is determined based at least in part on at least one of (a) a globally unique identifier for a serving cell in communication with the computing entity when the computing entity observed the observed neighbor cell; (b) a GNSS-based position estimate of the computing entity corresponding to when the computing entity observed the observed neighbor cell; or (c) a radio map-based position estimate of the computing entity corresponding to when the computing entity observed the observed neighbor cell. In an example embodiment, the observed locally unique identifier for the observed neighbor cell comprises operational parameters of the observed neighbor cell. In an example embodiment, at least one of (a) the observed neighbor cell is configured to communicate via long-term evolution (LTE) wireless broadband communications and the locally unique identifier for the observed neighbor cell comprises physical cell ID (PCI) and E-UTRA Absolute Radio Frequency Channel Number (EARFCN) values for the observed neighbor cell; (b) the observed neighbor cell is configured to communicate via Wideband Code Division Multiple Access (WCDMA) wireless broadband communications and the locally unique identifier for the observed neighbor cell comprises primary scrambling code (PSC) and UTRA Absolute Radio Frequency Channel Number (UARFCN) values for the observed neighbor cell; (c) the observed neighbor cell is configured to communicate via global system for mobile communications (GSM) wireless broadband communications and the locally unique identifier for the observed neighbor cell comprises base station identity code (BSIC) and Absolute Radio Frequency Channel Number (ARFCN) values for the observed neighbor cell; or (d) the observed neighbor cell is configured to communicate via 5G wireless broadband communications and the locally unique identifier for the observed neighbor cell comprises PCI and New Radio Absolute Radio Frequency Channel Number (NR-ARFCN) values for the observed neighbor cell. In an example embodiment, the plurality of instances of neighbor-cell information each correspond to a unique neighbor cell. In an example embodiment, identifying the particular instance of neighbor-cell information comprises using a clustering algorithm to identify geographically-related clusters of neighbor cells based on the approximate locations of the neighbor cells associated with corresponding globally unique identifiers.

According to yet another aspect of the present disclosure, an apparatus is provided. In an example embodiment, the apparatus comprises means for obtaining an observed locally unique identifier for an observed neighbor cell. The apparatus has access to at least a portion of a positioning map that comprises a plurality of instances of neighbor-cell information. Each instance of neighbor-cell information comprises a respective globally unique identifier configured to uniquely identify a corresponding neighbor cell in the positioning map. The respective globally unique identifier comprises a respective locally unique identifier of the corresponding neighbor cell and a respective indication of a respective estimated location of the corresponding neighbor cell. The apparatus comprises means for identifying a particular instance of neighbor-cell information that is associated with the observed neighbor cell. The particular instance of neighbor-cell information is identified from among the plurality of instances of neighbor-cell information within the at least a portion of the positioning map. Identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance. The apparatus comprises means for determining a position estimate based at least in part on the identified particular instance of neighbor-cell information that is associated with the observed neighbor cell.

BRIEF DESCRIPTION OF THE DRAWINGS

Figure 1:
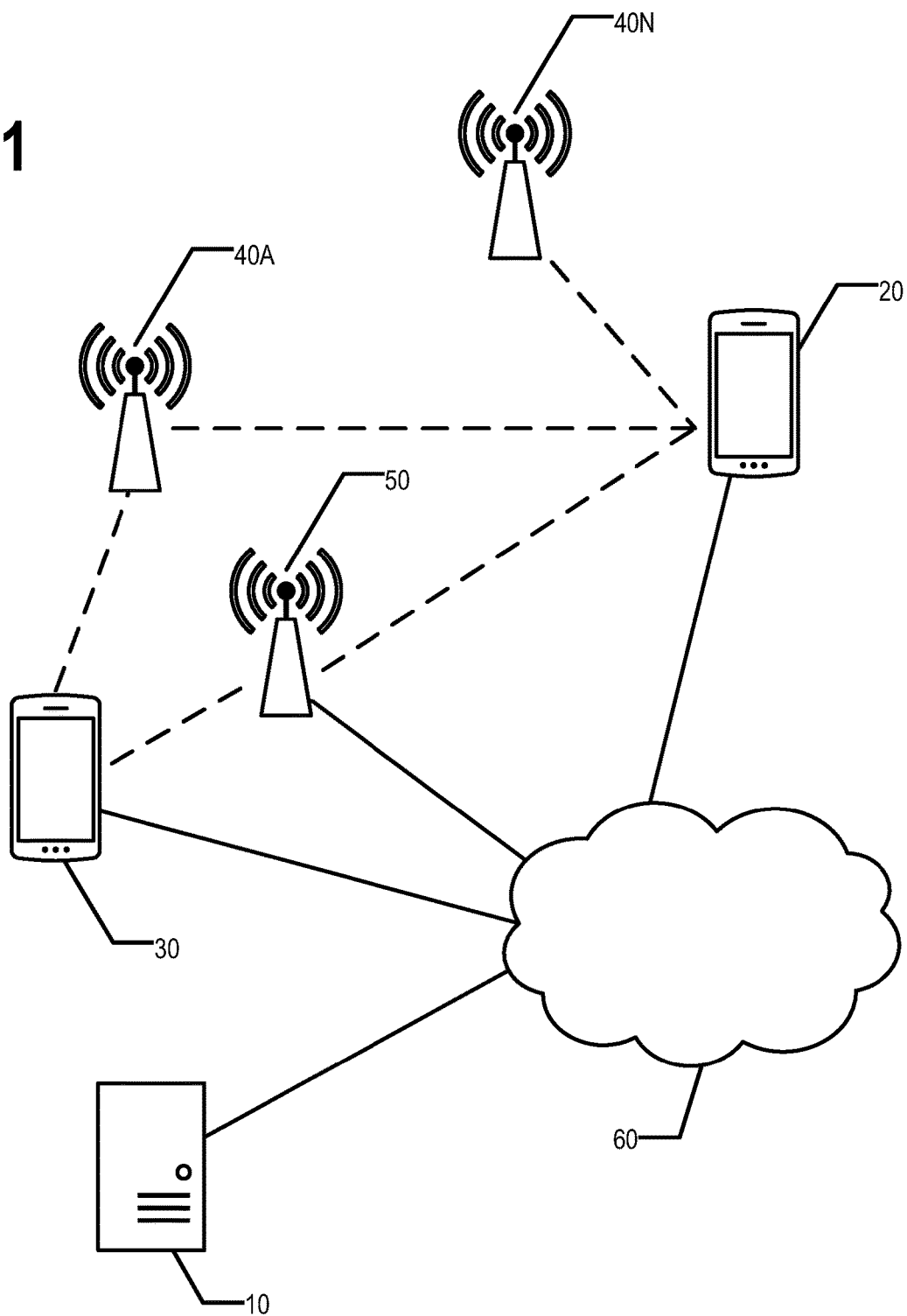
Figure 2A:
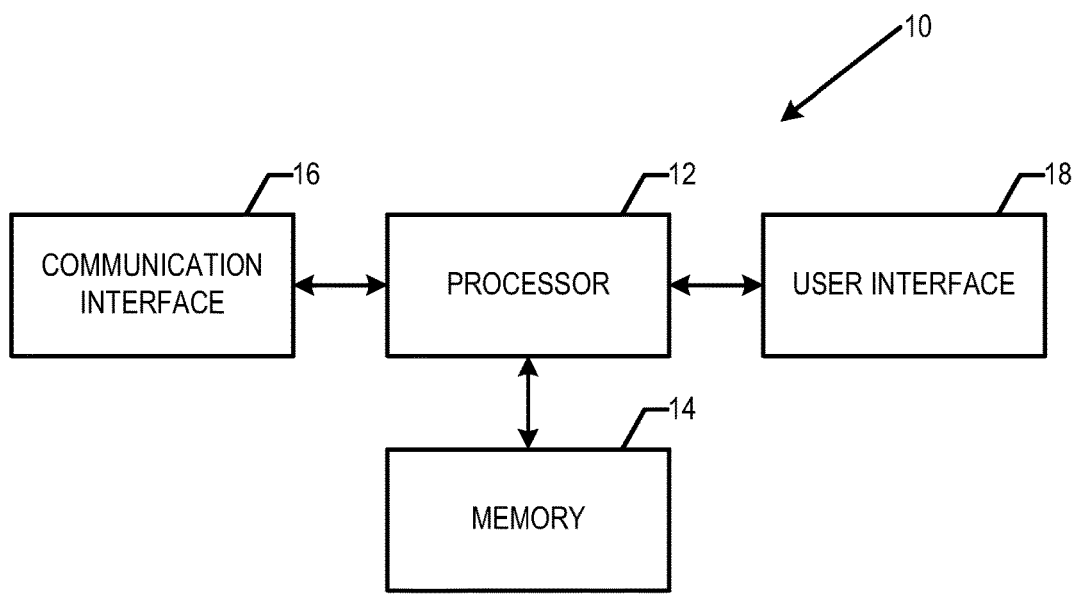
Figure 2B:
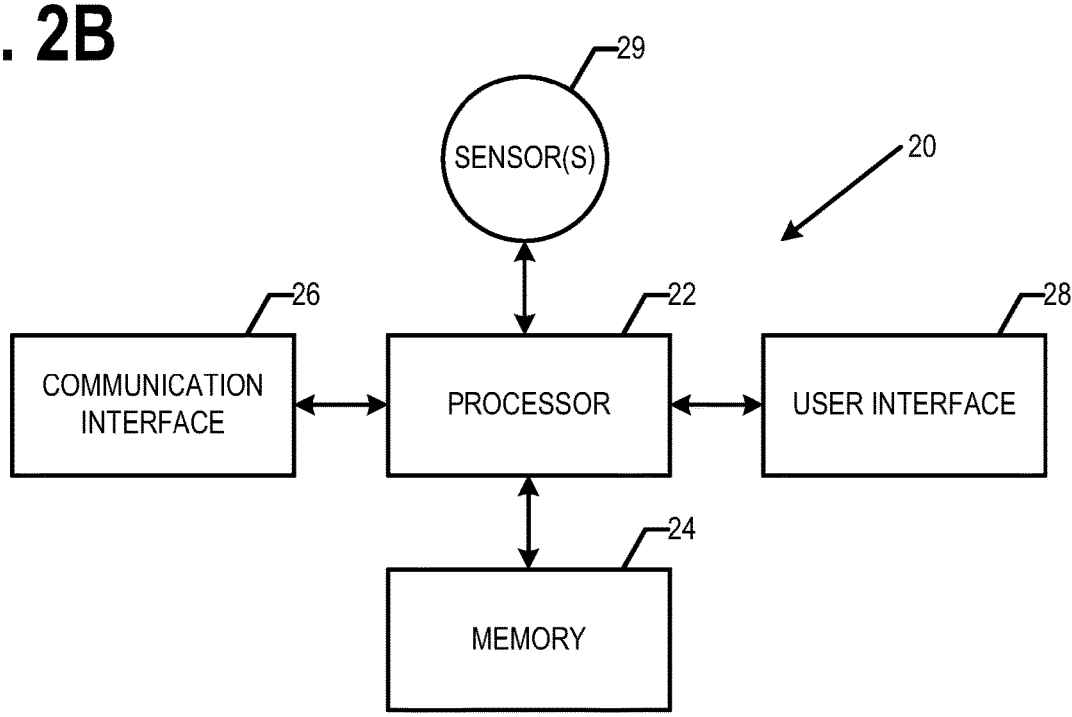
Figure 2C:
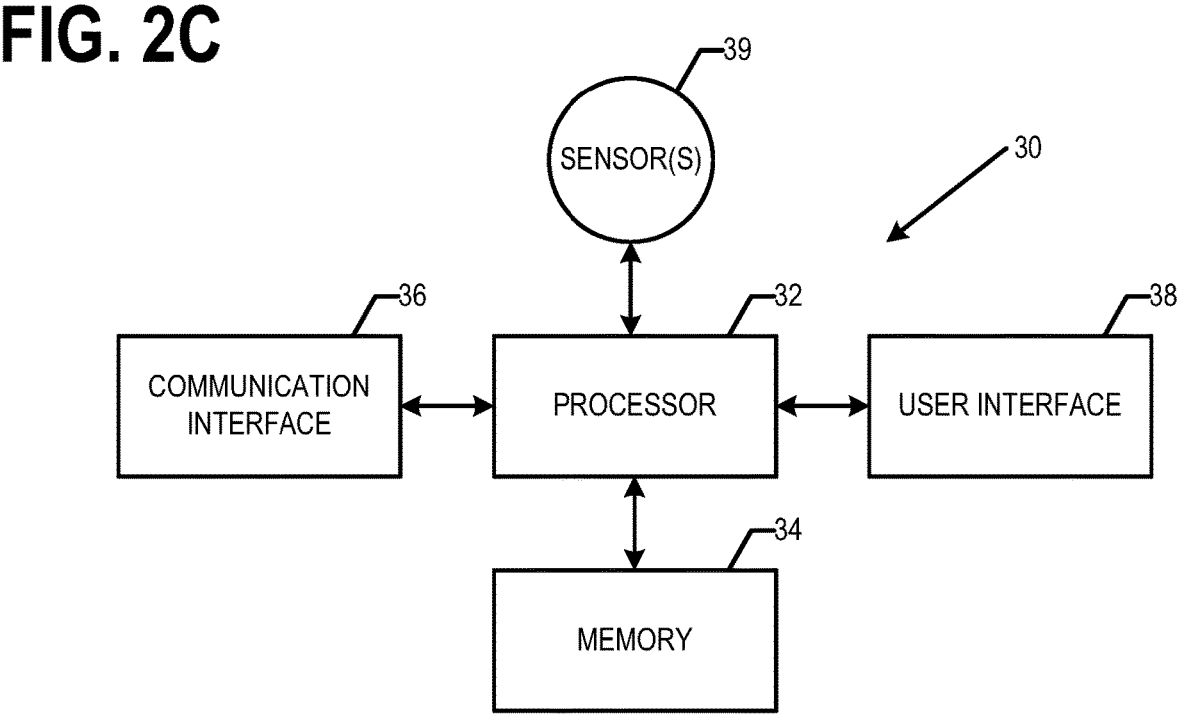
Figure 4:
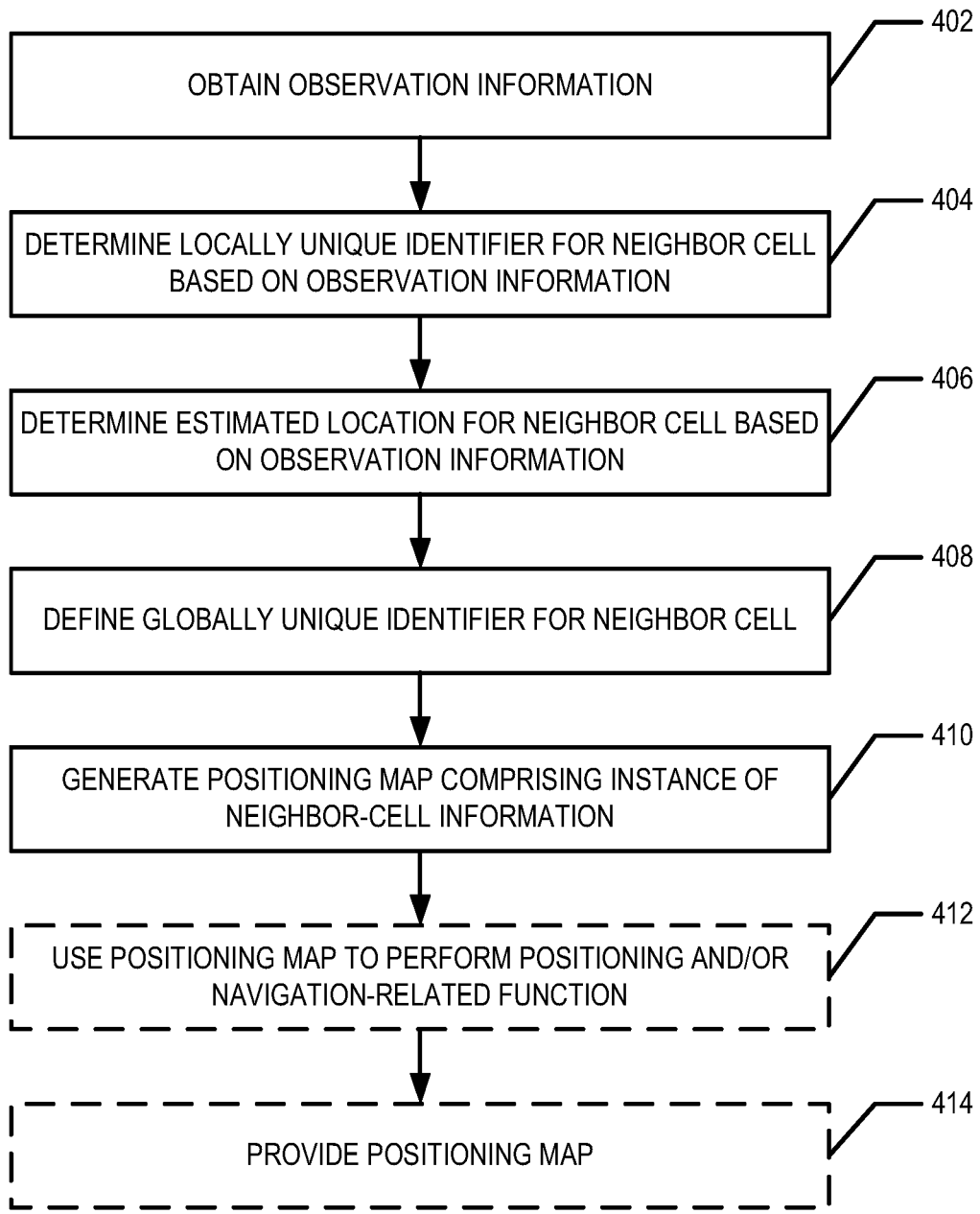
Figure 5:
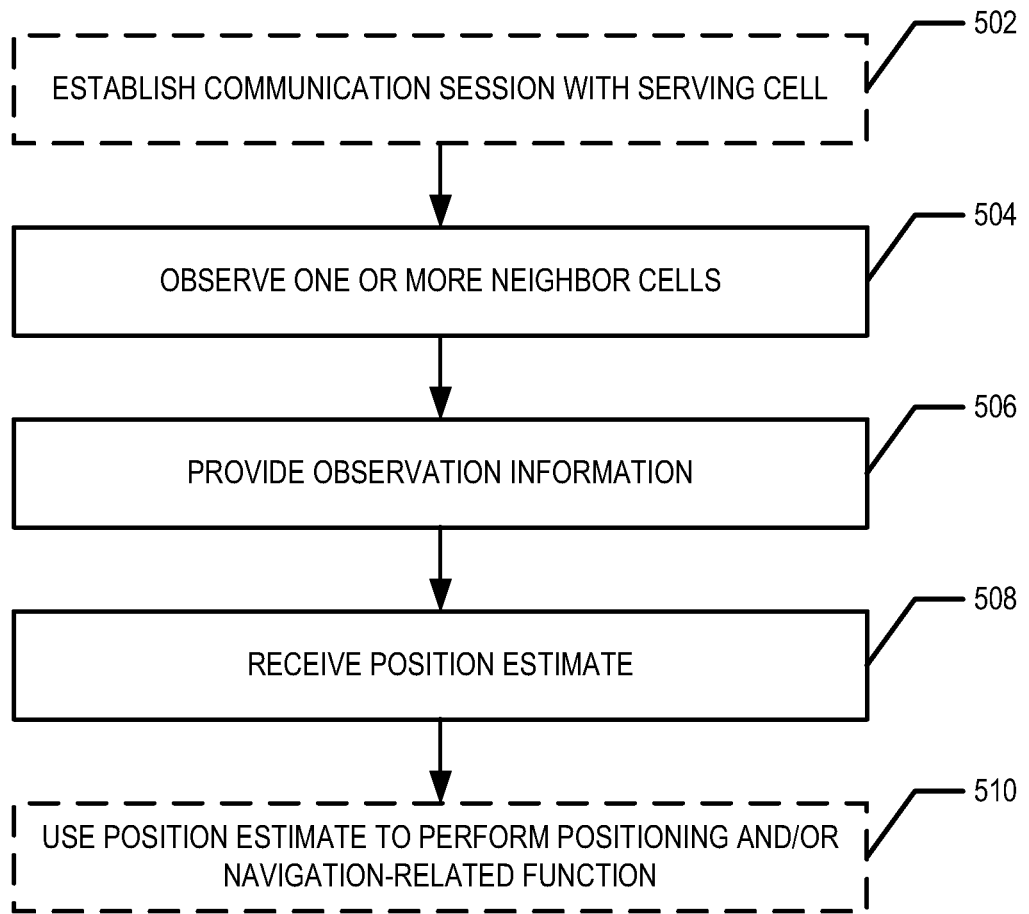
Figure 6:
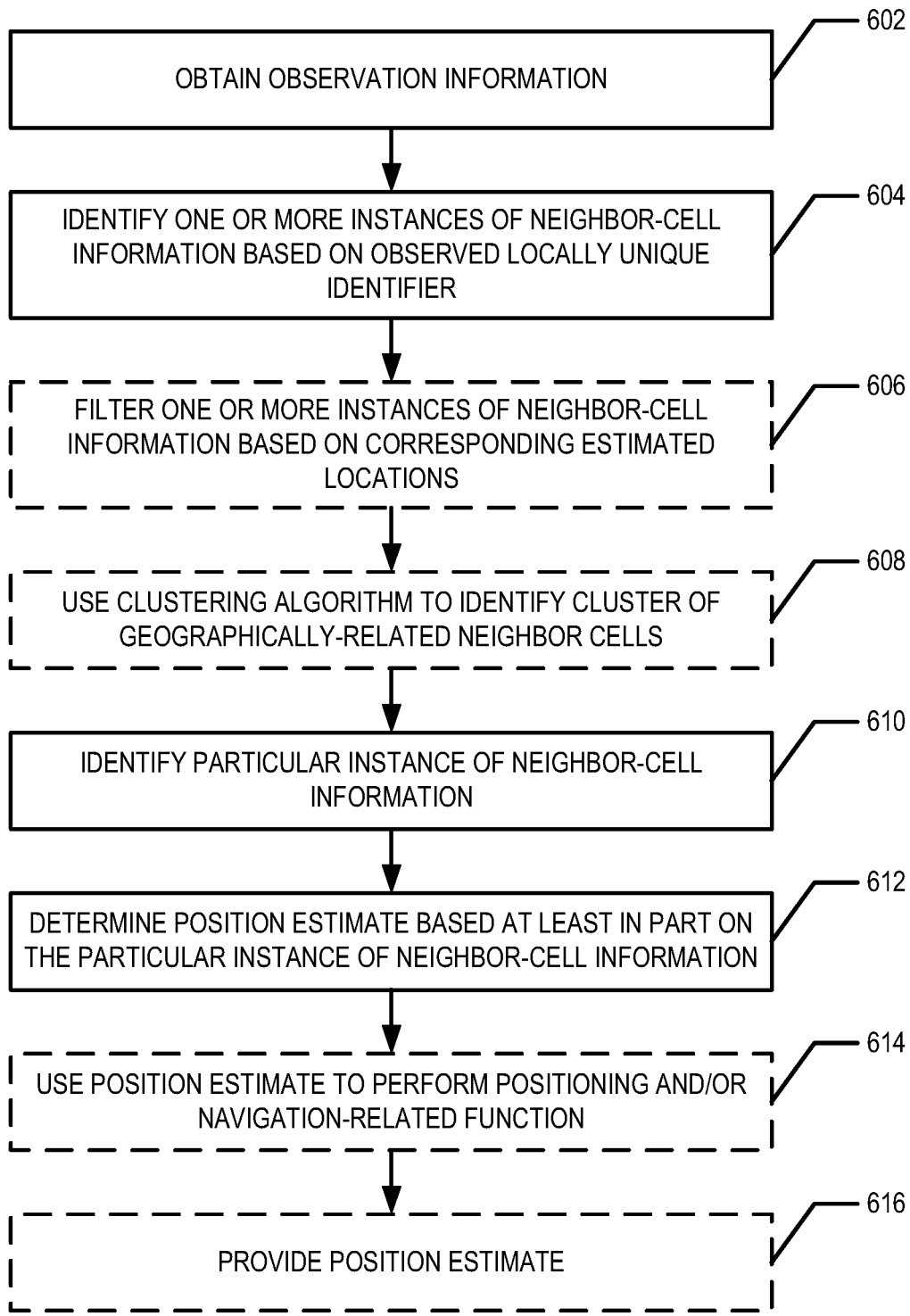

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network device that may be specifically configured in accordance with an example embodiment;

FIG. 2B is a block diagram of a mobile device that may be specifically configured in accordance with an example embodiment;

FIG. 2C is a block diagram of a computing entity that may be specifically configured in accordance with an example embodiment;

FIG. 3 is a flowchart illustrating operations performed, such as by the mobile device of FIG. 2B, in accordance with an example embodiment;

FIG. 4 is a flowchart illustrating operations performed, such as by the network device of FIG. 2A and/or the mobile device of FIG. 2B, in accordance with an example embodiment;

FIG. 5 is a flowchart illustrating operations performed, such as by the computing entity of FIG. 2C, in accordance with an example embodiment; and FIG. 6 is a flowchart illustrating operations performed, such as by the network device of FIG. 2A and/or the computing entity of FIG. 2C, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products for generating and/or using a positioning map comprising instances neighbor-cell information in association with respective globally unique identifiers are provided. For example, the positioning map is generated (e.g., created, updated, and/or the like) to include only one instance of neighbor-cell information corresponding to a particular neighbor cell. For example, for each neighbor cell for which an instance of neighbor-cell information is included in the positioning map, there is only one instance of neighbor-cell information corresponding to that neighbor cell. For example, the positioning map is configured to not include duplicate instances of neighbor-cell information. For example, each instance of neighbor-cell information of the positioning map corresponds to a unique neighbor cell.

For example, in various embodiments, a mobile device may observe a neighbor cell. As used herein, a mobile device (or computing entity) observes a neighbor cell by receiving, measuring, and/or observing a signal generated and/or transmitted by the neighbor cell. The mobile device may provide observation information corresponding to the mobile device's observation of the neighbor cell.

Based on the observation information, a network device or the mobile device may determine a locally unique identifier for the neighbor cell. For example, the locally unique identifier may comprise information that is available to the mobile device based on the observation of the neighbor cell. For example, the locally unique identifier may comprise one or more operational parameters for the neighbor cell. The network device or mobile device may further determine an estimated location of the neighbor cell. The estimated location of the neighbor cell may be determined based on a serving cell in communication with the mobile device when the mobile device observed the neighbor cell, a global navigation satellite system (GNSS) based position estimate of the mobile device that approximates the location of the mobile device when the neighbor cell was observed by the mobile device, a radio map-based position estimate of the mobile device that approximates the location of the mobile device when the neighbor cell was observed by the mobile device, and/or the like. The estimated location of the neighbor cell may be a georeferenced position (e.g., latitude and longitude), a geographic region (e.g., neighborhood, town/city, county, state, and/or the like), and/or the like.

A globally unique identifier for the neighbor cell may be defined by concatenating the locally unique identifier and the estimated location of the neighbor cell and/or combining the locally unique identifier and the estimated location of the neighbor cell in some other format. A positioning map may be generated (e.g., created, updated, and/or the like) to include an instance of neighbor-cell information corresponding to the neighbor cell and comprising, associated with, and/or indexed by the globally unique identifier defined for the neighbor cell. Each neighbor cell for which an instance of neighbor-cell information was stored in the positioning map would be associated with exactly one globally unique identifier and each globally unique identifier would be associated with exactly one neighbor cell and exactly one instance of neighbor-cell information.

Various embodiments provide for using a positioning map wherein instances of neighbor-cell information are comprising, associated with, and/or indexed by globally unique identifiers comprising observable locally unique identifiers. For example, in various embodiments, a computing entity may observe an observed neighbor cell. The computing entity may provide observation information corresponding to the computing entity's observation of the observed neighbor cell. A network device or the computing entity may obtain (e.g., determined based on the observation information) an observed locally unique identifier for the observed neighbor cell.

Based on the observed locally unique identifier, a particular instance of neighbor-cell information is identified. For example, a plurality of instances of neighbor-cell information that are comprising, associated with, and/or indexed by globally unique identifiers that comprise locally unique identifiers that match the observed locally unique identifier may be identified. The particular instance of neighbor-cell information is identified from the plurality of instances neighbor-cell information that are comprising, associated with, and/or indexed by globally unique identifiers that comprise locally unique identifiers that match the observed locally unique identifier based at least in part on the estimated location associated with the particular instance of neighbor-cell information.

The plurality of instances of neighbor-cell information having globally unique identifiers that comprise locally unique identifiers that match the observed locally unique identifier may be filtered based on an approximate location of the computing entity, through use of a clustering algorithm, and/or the like. For example, the approximate location of the computing entity may be determined based on a serving cell in communication with the computing entity when the computing entity observed the observed neighbor cell, a GNSS-based position estimate of the computing entity that approximates the location of the computing entity when the observed neighbor cell was observed by the computing entity, a radio map-based position estimate of the computing entity that approximates the location of the computing entity when the observed neighbor cell was observed by the computing entity, and/or the like. When multiple observed neighbor cells are observed by the computing entity, a clustering algorithm may be used to identify a group of globally unique identifiers that correspond to estimated locations that are geographically clustered (e.g., are associated with the same estimated location, estimated locations that correspond to the same region, or estimated locations that enable the corresponding neighbor cells to be observed from a common location) and that comprise the locally unique identifiers that match the observed locally unique identifiers of the observed neighbor cells. The particular instance of neighbor-cell information may be identified as a result of the filtering and/or clustering of the plurality of instances of neighbor-cell information comprising, associated with, and/or indexed by globally unique identifiers comprising locally unique identifiers that match the observed locally unique identifier.

A position estimate is then determined for the computing entity based at least in part on the particular instance of neighbor-cell information. The position estimate may be provided to the computing entity, used to perform an positioning and/or navigation-related function, and/or the like.

Thus, various embodiments provide a technical improvement over conventional neighbor cell-based positioning maps. In particular, by preventing and/or reducing the amount of duplicated information in the positioning map by defining a globally unique identifier for each neighbor cell based on the observable locally unique identifier, the size of the positioning map is greatly reduced. This allows for more efficient storage and transmission of the positioning map. Thus, various embodiments provide technical solutions to the technical problems related to storing and transmitting conventional positioning maps that enable positioning based on neighbor cells.

FIG. 1 provides an illustration of an example system that can be used in conjunction with various embodiments of the present invention. As shown in FIG. 1, the system may include one or more network devices 10, one or more mobile devices 20, one or more computing entities 30, one or more neighbor cells 40 (e.g., 40A, 40N), one or more serving cells 50, one or more networks 60, and/or the like. In various embodiments, a mobile device 20 and/or computing entity 30 may be a computing device configured to observe cellular signals and/or other radio frequency signals. For example, a mobile device 20 and/or computing entity 30 may be smart phone, tablet, laptop, personal digital assistant (PDA), mobile computing device, and/or the like. In an example embodiment, the network device 10 is a server, group of servers, distributed computing system, and/or other computing system. In various embodiments, the serving cells 50 and the one or more neighbor cells 40 are cellular network access points and/or gateways. The serving cell 50 is a cellular network access point and/or gateway that the mobile device 20 and/or computing entity 30 is in communication with. For example, an open communication session is established and/or active between the serving cell 50 and the mobile device 20 and/or computing entity 30. The neighbor cells 40 are cellular network access points and/or gateways that are observable by the mobile device 20 and/or computing entity 30 but for which an open and/or active communication session between the neighbor cell 40 and the mobile device 20 and/or computing entity 30 is not established. For example, the network device 10 may be in communication with one or more mobile devices 20 and/or computing entities 30, via corresponding serving cells 50 in communication with the respective mobile devices 20 and/or computing entities 30, for example, via one or more wired or wireless networks 50.

In an example embodiment, a network device 10 may comprise components similar to those shown in the example network device 10 diagrammed in FIG. 2A. In an example embodiment, the network device 10 is configured to receive, access, and/or otherwise obtain observation information; determine a locally unique identifier for a neighbor cell based on the observation information; determine an estimated location for the neighbor cell based on the observation information; define a globally unique identifier for the neighbor cell based on the locally unique identifier and the estimated location for the neighbor cell; create, update, and/or otherwise generate a positioning map to include an instance of neighbor-cell information corresponding to the neighbor cell and comprising, associated with, and/or indexed by the globally unique identifier; and/or the like. In an example embodiment, the network device 10 is configured to receive, access, and/or otherwise obtain an observed locally unique identifier for a neighbor cell; identify a particular instance of neighbor-cell information based at least in part on the observed locally unique identifier; determine a position estimate based at least in part on the particular instance of neighbor-cell information; and/or the like. In various embodiments, the network device 10 is configured to perform one or more positioning and/or navigation-related functions.

For example, as shown in FIG. 2A, the network device 10 may comprise a processor 12, memory 14, a user interface 18, a communications interface 16, and/or other components configured to perform various operations, procedures, functions, or the like described herein. In various embodiments, the network device 10 stores a geographical database and/or positioning map (e.g., in memory 14), such as a radio environment and/or cellular network access point positioning map, for example. In at least some example embodiments, the memory 14 is non-transitory.

In an example embodiment, the mobile device 20 is a mobile computing device such as a smartphone, tablet, laptop, PDA, an Internet of things (IoT) device, and/or the like. In an example embodiment, the mobile device 20 may be configured to establish a communication session with a serving cell 50, observe one or more neighbor cells 40, provide observation information regarding observations of the one or more neighbor cells 40, and/or the like. In an example embodiment, as shown in FIG. 2B, the mobile device 20 may comprise a processor 22, memory 24, a communications interface 26, a user interface 28, one or more sensors 29 and/or other components configured to perform various operations, procedures, functions or the like described herein. In various embodiments, the mobile device 20 stores at least a portion of one or more digital maps (e.g., geographic databases, positioning maps, and/or the like) and/or computer executable instructions for performing one or more neighbor cell observation and/or providing of observation information functions in memory 24. In at least some example embodiments, the memory 24 is non-transitory.

In various embodiments, the sensors 29 comprise one or more location sensors such as a GNSS sensor, inertial measurement unit (IMU) sensors (e.g., accelerometers, gyroscopes, magnetometers, and/or the like), altimeters, and/or the like. In various embodiments, the sensors 29 comprise one or more image sensors configured to capture visual samples, such as digital camera(s), 3D cameras, 360° cameras, and/or image sensors. In various embodiments, the one or more sensors 29 may comprise one or more interfaces, such as radio interfaces, configured to observe and/or receive signals generated and/or transmitted by one or more access points and/or other computing entities (e.g., serving cell 50, neighbor cells 40). For example, the one or more interfaces may be configured (possibly in coordination with processor 22) to determine a locally unique identifier and/or operational parameters of a cellular network access point with which the is not engaged in an open and/or active communication session. As used herein, a observes a neighbor cell 40 by receiving, capturing, measuring and/or observing a signal generated and/or transmitted by the neighbor cell 40. In an example embodiment, the interface may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 26. In various embodiments, the sensors 29 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

In an example embodiment, the computing entity 30 is a mobile computing device such as a smartphone, tablet, laptop, PDA, an Internet of things (IoT) device, and/or the like. In an example embodiment, the computing entity 30 may be configured to establish a communication session with a serving cell 50, observe one or more neighbor cells 40, determine a locally unique identifier for an observed neighbor cell 40, provide observation information regarding observations of the one or more observed neighbor cells 40, receive a position estimate, use the position estimate to perform one or more positioning and/or navigation-related functions, and/or the like. In an example embodiment, as shown in FIG. 2C, the computing entity 30 may comprise a processor 32, memory 34, a communications interface 36, a user interface 38, one or more sensors 39 and/or other components configured to perform various operations, procedures, functions or the like described herein. In various embodiments, the computing entity 30 stores at least a portion of one or more digital maps (e.g., geographic databases, positioning maps, and/or the like) and/or computer executable instructions for performing one or more neighbor cell observation, providing of observation information, and/or performing one or more positioning and/or navigation-related functions in memory 34. In at least some example embodiments, the memory 34 is non-transitory.

In various embodiments, the sensors 39 comprise one or more location sensors such as a GNSS sensor, inertial measurement unit (IMU) sensors (e.g., accelerometers, gyroscopes, magnetometers, and/or the like), altimeters, and/or the like. In various embodiments, the sensors 39 comprise one or more image sensors configured to capture visual samples, such as digital camera(s), 3D cameras, 360° cameras, and/or image sensors. In various embodiments, the one or more sensors 39 may comprise one or more interfaces, such as radio interfaces, configured to observe and/or receive signals generated and/or transmitted by one or more access points and/or other computing entities (e.g., serving cell 50, neighbor cells 40). For example, the one or more interfaces may be configured (possibly in coordination with processor 32) to determine a locally unique identifier and/or operational parameters of a cellular network access point with which the computing entity 30 is not engaged in an open and/or active communication session. As used herein, a computing entity 30 observes a neighbor cell 40 by receiving, capturing, measuring and/or observing a signal generated and/or transmitted by the neighbor cell 40. In an example embodiment, the interface may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 36. In various embodiments, the sensors 39 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 60 including, for example, a wired or wireless Personal Area Network (PAN), Local Area Network (LAN), Metropolitan Area Network (MAN), Wide Area Network (WAN), cellular network, and/or the like. In an example embodiment, a network 60 comprises the automotive cloud, digital transportation infrastructure (DTI), radio data system (RDS)/high definition (HD) radio or other digital radio system, and/or the like. For example, a mobile device 20 and/or computing entity 30 may be in communication with a network device 10 via the network 60. For example, a mobile device 20 and/or computing entity 30 may communicate with the network device 10 via a network, such as the Cloud. For example, the Cloud may be a computer network that provides shared computer processing resources and data to computers and other devices connected thereto. For example, the mobile device 20 and/or computing entity 30 may be configured to observe one or more neighbor cells 40 and provide observation information corresponding to the observation of the one or more neighbor cells 40 via the network 60. For example, the network device 10 may configured to receive observation information and provide at least a portion of a positioning map comprising an instance of neighbor-cell information comprising, associated with, and/or indexed by a globally unique identifier and/or a position estimate via the network 60. In various embodiments, the mobile device 20 and/or computing entity 30 may communicate with the network 60 via a serving cell 50.

Certain example embodiments of the network device 10, mobile device 20, and computing entity 30 are described in more detail below with respect to FIGS. 2A, 2B, and 2C.

II. Example Operation(s)

When a mobile device 20 or a computing entity 30 are in communication with a serving cell 50, the serving cell 50 may provide (e.g., transmit), as part of the open and/or active communication session between the serving cell 50 and the mobile device 20 and/or computing entity 30, a globally unique identifier that may be used to uniquely identify the serving cell 50 in a positioning map and/or cellular network access point database. The position of the mobile device 20 and/or computing entity 30 may then be estimated to be located within the broadcast and/or coverage area and/or region of the serving cell 50. However, the broadcast and/or coverage area and/or region of a serving cell 50 may have a diameter of up to 70 km or 45 miles. Thus, the positioning of the mobile device 20 and/or computing entity 30 based solely on the serving cell 50 is insufficient for many positioning and/or navigation-related functions.

Often one or more neighbor cells 40 are observable by a mobile device 20 or computing entity 30. A neighbor cell 40 is a cellular network access point that the mobile device 20 or computing entity 30 can observe (e.g., receive, measure, and/or observe a signal generated and/or transmitted by the neighbor cell) but an open and/or active communication session is not established between the neighbor cell 40 and the mobile device 20 and/or computing entity 30. As such, the mobile device 20 and/or computing entity 30 may observe operational parameters of the neighbor cell 40, but does not have access to a globally unique identifier for the neighbor cell 40. Thus, conventional positioning maps that include neighbor cells tend to divide serving cell broadcast and/or coverage areas and/or regions into smaller areas corresponding to portions of the serving cell broadcast and/or coverages areas where various neighbor cells are observable. In particular, the information relating to the neighbor cells is stored hierarchically under the serving cell information. Therefore, if a neighbor cell may be observed in four different serving cell broadcast and/or coverage areas and/or regions, four different instances of information relating to the neighbor cell are stored, with each instance stored in association with a different serving cell. This means that neighbor cell radio maps are large in size and most of the neighbor cell information is redundant. These radio maps are generally communicated via bandwidth-limited networks and portions of the radio maps may be stored by memory-limited mobile devices and/o computing entities for use in offline positioning, for example.

Various embodiments provide methods, apparatus, systems, and computer program products for generating and/or using a positioning map comprising instances neighbor-cell information comprising and/or stored in association with and/or indexed by respective globally unique identifiers. For example, the positioning map is generated (e.g., created, updated, and/or the like) to include only one instance of neighbor-cell information corresponding to a particular neighbor cell. For example, for each neighbor cell for which an instance of neighbor-cell information is included in the positioning map, there is only one instance of neighbor-cell information corresponding to that neighbor cell stored in the positioning map. For example, the positioning map is configured to not include duplicate instances of neighbor-cell information. Thus, various embodiments provide a technical solution to the technical problems of generating radio maps and/or positioning maps that enable accurate positioning through the use of neighbor cell observations that do not include large amounts of redundant information. For example, various embodiments provide and/or use radio maps and/or positioning maps that enable accurate positioning through the use of neighbor cell observations that can be efficiently stored and/or transmitted. In particular, the use of the globally unique identifier defined at least in part based on a locally unique identifier for the neighbor cells enables the various technical improvements provided by various embodiments.

A. Example Generation of a Positioning Map

In various embodiments, a positioning map comprising instances of neighbor-cell information that comprise, are associated with, and/or indexed by globally unique identifiers are generated (e.g., created, updated, and/or otherwise generated) using crowd-sourced information/data. For example, mobile devices 20 provide observation information providing locally identifying information/data for neighbor cells observed by the respective mobile devices. For example, the locally identifying information/data may comprise operational parameters of the neighbor cell that are observable to a mobile device. The locally identifying information is used to generate and/or define a locally unique identifier for the neighbor cell. The observation information may further comprise an indication of the approximate location of the mobile device when it observed the neighbor cell.

In various embodiments, the locally unique identifier is unique within a region wherein the neighbor cell is located. The region may be a geographic region; a region designated by rounded, estimated, and/or truncated latitude and longitude values; and/or other region designator. For example, the estimated location of the neighbor cell is described by latitude and longitude values only extending to one, two, three, or four decimal places (e.g., corresponding to regions of approximately a couple hundred square kilometers to several square meters), based on the application, density of neighbor cells in the area, and/or the like, in various embodiments. For example, the estimated location of the neighbor cell is described by a neighborhood name, town or city name, county name, state name, province name, and/or the like, in an example embodiment. In various embodiments, the regions are defined such that each neighbor cell within each region is uniquely identified by the corresponding locally unique identifier within the corresponding region.

In various embodiments, a network device 10 or a mobile device 20 may use the observation information to define a globally unique identifier for a neighbor cell. The globally unique identifier comprises the locally unique identifier and an indication of the estimated location of the neighbor cell. For example, the globally unique identifier is defined by concatenating the locally unique identifier of a neighbor cell and the estimated location of the neighbor cell, in an example embodiment. A positioning map may then be generated (e.g., created, updated, and/or otherwise generated) by the network device 10 or mobile device 20 to include an instance of neighbor-cell information comprising, associated with, and/or indexed by the globally unique identifier defined for the neighbor cell. As a globally unique identifier may be defined for each neighbor cell based on locally identifying information/data for respective neighbor cells that is observable by a mobile device 20 or computing entity 30, duplication of instances of neighbor-cell information is unnecessary and the redundant information stored by the positioning map may be removed and/or reduced compared to conventional positioning maps that enable neighbor cell-based positioning.

FIG. 3 provides a flowchart illustrating various processes, procedures, operations, and/or the like performed, for example, by a mobile device 20 to provide observation information, in accordance with an example embodiment. The observation information may be used by a network device 10 and/or the mobile device 20 to generate (e.g., create, update, and/or the like) a positioning map comprising neighbor-cell information comprising and/or stored in association with and/or indexed by globally unique identifiers. For example, the observation information may be used to generate (e.g., create, update, and/or the like) a positioning map that does not include and/or with a reduced amount of redundant information regarding neighbor cells.

Starting at block 302, a mobile device 20 optionally establishes an open and/or active communication session with a cellular network access point such that that cellular network access point becomes the serving cell 50 for the mobile device 20. For example, the mobile device 20 may comprise means, such as processor 22, memory 24, communications interface 26, sensors 29, and/or the like, for establishing an open and/or active communication session with a serving cell 50.

At block 304, the mobile device 20 observes one or more neighbor cells 40 and generates corresponding observation information. For example, the mobile device 20 may comprise means, such as processor 22, memory 24, communications interface 26, sensors 29, and/or the like for observing one or more neighbor cells 40 and generating corresponding observation information. For example, the mobile device 20 may observe a signal generated and/or transmitted by a neighbor cell 40. The mobile device 20 determines locally identifying information for the neighbor cell 40 based on the mobile device's 20 observation of the signal generated and/or transmitted by the neighbor cell 40. For example, based on the observation of the signal generated and/or transmitted by the neighbor cell 40, the mobile device 20 determines one or more operational parameters of the neighbor cell 40, in an example embodiment.

For example, when the neighbor cell is configured to communicate via long-term evolution (LTE) wireless broadband communications and the determined operational parameters include physical cell ID (PCI) and E-UTRA Absolute Radio Frequency Channel Number (EARFCN) values for the neighbor cell. For example, when the neighbor cell is configured to communicate via Wideband Code Division Multiple Access (WCDMA) wireless broadband communications, the determined operational parameters include primary scrambling code (PSC) and UTRA Absolute Radio Frequency Channel Number (UARFCN) values for the neighbor cell. For example, when the neighbor cell is configured to communicate via global system for mobile communications (GSM) wireless broadband communications, the determined operational parameters include base station identity code (BSIC) and Absolute Radio Frequency Channel Number (ARFCN) values for the neighbor cell. For example, when the neighbor cell is configured to communicate via 5G wireless broadband communications, the determined operational parameters include PCI and New Radio Absolute Radio Frequency Channel Number (NR-ARFCN) values for the neighbor cell. Various other observable operational parameters may be used for various other cellular communication protocols in various embodiments, as appropriate for the application.

In various embodiments, the observation information includes the determined operational parameters for the neighbor cell and/or other observable locally identifying information for the neighbor cell. In various embodiments, the observation information further includes an indication of an estimated location of the neighbor cell 40. For example, the observation information may include and/or be determined based on an approximate location of the mobile device 20 when the mobile device 20 observed the neighbor cell. For example, the approximate location of the mobile device 20 may be and/or may be determined based on a globally unique identifier for a serving cell in communication with the mobile device when the mobile device observed the neighbor cell; a GNSS-based position estimate of the mobile device corresponding to when the mobile device observed the neighbor cell; a radio map-based position estimate of the mobile device corresponding to when the mobile device observed the neighbor cell; and/or the like.

For example, when the mobile device 20 is in communication with a particular serving cell 50 when the mobile device 20 observes a particular neighbor cell 40, it may be determined that the particular neighbor cell 40 is located in the same region as the particular serving cell 50 (e.g., same geopolitical region; same region defined by rounded, estimated, and/or truncated latitude and longitude values; and/or other region designator). For example, when a position estimate was determined for the mobile device 20 using a GNSS location sensor 29 of the mobile device within a period of time (e.g., ten minutes, five minutes, two minutes, one minute) prior to and/or when the mobile device 20 observes a particular neighbor cell 40, it may be determined that the particular neighbor cell 40 is located within the same region as the mobile device 20 as indicated by the GNSS-based position estimate for the mobile device 20. For example, when a position estimate was determined for the mobile device 20 using a radio map and one or more radio interfaces of sensors 29 of the mobile device within a period of time (e.g., ten minutes, five minutes, two minutes, one minute) prior to and/or when the mobile device 20 observes a particular neighbor cell 40, it may be determined that the particular neighbor cell 40 is located within the same region as the mobile device 20 as indicated by the radio map-based position estimate for the mobile device 20. In various embodiments, the length of the period of time prior to the observation of the particular neighbor cell 40 for which such a GNSS-based or radio map-based position estimate of the mobile device 20 is deemed usable and/or appropriate for determining an estimated location of the particular neighbor cell 40 may be determined based on motion characteristics of the mobile device 20 immediately before or when the particular neighbor cell 40 was observed by the mobile device 20. For example, if the mobile device 20 was known to be in a moving vehicle immediately prior to observing the particular neighbor cell 40, the period of time may be shorter than if the mobile device 20 was known to be not moving or moving at a walking speed.

At block 306, the mobile device 20 provides the observation information. For example, in various embodiments, the mobile device 20 provides and/or passes the observation information to processor 22 (e.g., as input to a positioning map generation application operating on the mobile device 20) and/or transmits the observation information (e.g., via server cell 50, one or more wired and/or wireless networks 60, and/or the like) such that a network device 10 receives the observation information. For example, the mobile device 20 may comprise means, such as processor 22, memory 24, communications interface 26, and/or the like, for providing the observation information.

FIG. 4 provides a flowchart illustrating various processes, procedures, operations, and/or the like for generating a positioning map comprising an instance of neighbor-cell information comprising, associated with, and/or indexed by a globally unique identifier. In various embodiments, the various processes, procedures, operations, and/or the like shown in FIG. 4 are performed by the network device 10 and/or mobile device 20.

Starting at block 402, observation information corresponding to an observation of a neighbor cell 40 by a mobile device 20 is obtained. For example, the network device 10 receives observation information received that was provided (e.g., transmitted) by the mobile device 20. The network device 10 processes the observation information (e.g., provide the observation information to processor 12 and/or a positioning map generation application being executed by the processor 12) responsive to receiving the observation information, in an example embodiment. In an example embodiment, the network device 10 stores the received observation information in memory 14 and access the observation information at a later time for processing (e.g., providing to processor 12 and/or a positioning map generation application being executed by the processor 12). For example, the network device 10 may comprise means, such as processor 12, memory 14, communication interface 16, and/or the like for obtaining observation information generated by a mobile device 20.

For example, the mobile device 20 may access observation information stored in memory 24 and provide the observation information to a positioning map generation application being executed by the processor 22. For example, the mobile device 20 may comprise means, such as processor 22, memory 24, and/or the like, for obtaining observation information.

At block 404, a locally unique identifier for the neighbor cell 40 is determined based on the observation information. For example, the network device 10 and/or the mobile device 20 determines a locally unique identifier for the neighbor cell 40 based on the observation information. For example, the network device 10 and/or the mobile device 20 may comprise means, such as processor 12, 22, memory 14, 24, and/or the like for determining a locally unique identifier for the neighbor cell 40 based on the observation information. For example, in an example embodiment, the map generation application operating on processor 12, 22 determines a locally unique identifier for the neighbor cell 40 based on the observation information.

As noted above, the observation information comprises locally identifying information for the neighbor cell 40 that was observable by the mobile device 20, such as operational parameters of the neighbor cell 40. For example, when the neighbor cell is configured to communicate via LTE wireless broadband communications, the observation information includes operational parameters such as PCI and EARFCN values for the neighbor cell. For example, when the neighbor cell is configured to communicate via WCDMA wireless broadband communications, the observation information includes operational parameters such as PSC and UARFCN values for the neighbor cell. For example, when the neighbor cell is configured to communicate via GSM wireless broadband communications, the observation information includes operational parameters such as BSIC and ARFCN values for the neighbor cell. For example, when the neighbor cell is configured to communicate via 5G wireless broadband communications, the observation information includes operational parameters such as PCI and NR-ARFCN values for the neighbor cell. Various other observable operational parameters may be included in the observation information as appropriate for the cellular communication protocol via which the neighbor cell 40 is configured to communicate.

In an example embodiment, the locally unique identifier is determined, formed, defined, and/or the like by combining one or more operational parameters for the neighbor cell into a sequence of characters and/or string (e.g., a text string) that acts as the locally unique identifier. For example, in the example scenario of a neighbor cell 40 that communicates via LTE, the PCI and EARFCN values for the neighbor cell may be combined, concatenated (possibly with a divider character such as a space, slash, hyphen, period, comma, and/or the like there between) and/or the like to for a sequence of characters or string that is a locally unique identifier for the neighbor cell 40. As should be understood, the operational parameters for the neighbor cell 40 may be combined in various ways to form a sequence of characters or string that is a locally unique identifier for the neighbor cell 40.

At block 406, an estimated location for the neighbor cell 40 is determined based on the observation information. For example, the network device 10 and/or mobile device 20 determines an estimated location for the neighbor cell 40 based on the observation information. For example, the network device 10 and/or the mobile device 20 may comprise means, such as processor 12, 22, memory 14, 24, and/or the like for determining an estimated location for the neighbor cell 40 based on the observation information. For example, in an example embodiment, the map generation application operating on processor 12, 22 determines an estimated location for the neighbor cell 40 based on the observation information.

For example, the observation information may comprise an indication of the estimated location of the neighbor cell 40. For example, in an example embodiment, the indication of the estimated location of the neighbor cell 40 comprises an estimated location (e.g., name of a geographic region; rounded, estimated, and/or truncated latitude and longitude values; and/or other region designator) for the neighbor cell 40. In such an embodiment, determining the estimated location of the neighbor cell 40 comprises determining and/or reading the indication of the estimated location of the neighbor cell 40 from the observation information. In various embodiments, the estimated location of the neighbor cell 40 was determined based on an approximate location of the mobile device 20 when the mobile device 20 observed the neighbor cell 40. For example, it may be assumed that the mobile device 20 and the neighbor cell 40 are located within the same region (e.g., geographic region, geographical region indicated by rounded, estimated, and/or truncated latitude and longitude values, and/or region identified and/or defined by another region designator) when the mobile device 20 observed the neighbor cell 40.

In various embodiments, the indication of the estimated location of the neighbor cell 40 provided by the observation information includes an indication of an approximate location of the mobile device 20 when the mobile device 20 observed the neighbor cell 40. For example, the indication of the approximate location of the mobile device 20 may include a globally unique identifier for a serving cell in communication with the mobile device 20 when the mobile device observed the neighbor cell 40; a GNSS-based position estimate of the mobile device 20 corresponding to when the mobile device 20 observed the neighbor cell 40; a radio map-based position estimate of the mobile device 20 corresponding to when the mobile device 20 observed the neighbor cell 40; and/or the like. For example, when the mobile device 20 is in communication with a particular serving cell 50 when the mobile device 20 observes the neighbor cell 40, a globally unique identifier for the particular serving cell 50 may be provided as an indication of the approximate location of the mobile device 20 when the mobile device observed the neighbor cell 40. For example, when a position estimate was determined for the mobile device 20 using a GNSS location sensor 29 of the mobile device within a period of time (e.g., ten minutes, five minutes, two minutes, one minute) prior to and/or when the mobile device 20 observed the neighbor cell 40, the GNSS-based position estimate for the mobile device 20 may be provided as an indication of the approximate location of the mobile device 20 when the mobile device observed the neighbor cell 40. For example, when a position estimate was determined for the mobile device 20 using a radio map and one or more radio interfaces of sensors 29 of the mobile device within a period of time (e.g., ten minutes, five minutes, two minutes, one minute) prior to and/or when the mobile device 20 observed the neighbor cell 40, the radio map-based position estimate for the mobile device 20 may be provided as an indication of the approximate location of the mobile device 20 when the mobile device 20 observed the neighbor cell 40. In various embodiments, the length of the period of time prior to the observation of the particular neighbor cell 40 for which such a GNSS-based or radio map-based position estimate of the mobile device 20 is deemed usable and/or appropriate for providing as an indication of the approximate location of the mobile device when the mobile device 20 observed the neighbor cell 40 may be determined based on motion characteristics of the mobile device 20 immediately before or when the particular neighbor cell 40 was observed by the mobile device 20. For example, if the mobile device 20 was known to be in a moving vehicle immediately prior to observing the particular neighbor cell 40, the period of time may be shorter than if the mobile device 20 was known to be not moving or moving at a walking speed immediately prior to observing the particular neighbor cell 40.

In various embodiments, when the observation information includes an indication of an approximate location of the mobile device 20 when the mobile device 20 observed the neighbor cell 40, determining the estimated location of the neighbor cell 40 comprises determining a region (e.g., name of a geographic region; rounded, estimated, and/or truncated latitude and longitude values; and/or other region designator) that the mobile device 20 was located in when the mobile device 20 observed the neighbor cell 40 and determining that the neighbor cell 40 is located in that same region.

In various embodiments, a plurality of indications of the estimated location of the neighbor cell 40 as indicated by a plurality of instances of observation information generated and provided by one or more mobile devices 20 and corresponding to a plurality of observations of the neighbor cell 40 are used to further refine and/or determine a more accurate estimated location of the neighbor cell 40. For example, based on a plurality of indications of the estimated location of the neighbor cell 40 as indicated by a plurality of instances of observation information generated and provided by one or more mobile device 20 and corresponding to a plurality of observations of the neighbor cell 40 may be used to determine the estimated location of the neighbor cell 40 to latitude and longitude values extending to five or more decimal places, in various embodiments.

At block 408, a globally unique identifier for the neighbor cell 40 is defined. For example, the network device 10 and/or the mobile device 20 defines a globally unique identifier for the neighbor cell 40. For example, the network device 10 and/or the mobile device 20 comprise means, such as processor 12, 22, memory 14, 24, and/or the like, for defining a globally unique identifier for the neighbor cell 40. In various embodiments, the globally unique identifier is defined by combining the locally unique identifier and the estimated location of the neighbor cell 40. For example, a sequence of characters and/or string providing the locally unique identifier may be combined and/or concatenated with a sequence of characters and/or string providing the estimated location of the neighbor cell 40 to define, generate, determine, and/or form the globally unique identifier for the neighbor cell 40. As should be understood, the locally unique identifier and the estimated location for the neighbor cell 40 may be combined in various ways in various embodiments to define the globally unique identifier for the neighbor cell 40.

As noted above, the estimated location of the neighbor cell 40 may correspond to a region. Such regions are defined with a granularity such that the operational parameters and/or locally identifying information used to generate the locally unique identifier for the neighbor cell is unique within the region corresponding to the estimated location of the neighbor cell 40. For example, in any region corresponding to the estimated location of a neighbor cell 40 within the positioning map, no more than one neighbor cell 40 is configured to communicate via a particular communication protocol with a particular base station identifier value and at a particular channel value. In various embodiments, different regions may be defined with varying sizes and/or granularity based on, for example, the local density of cellular network access points and/or the like. For example, regions located in urban areas may be geographically smaller and/or cover a smaller area than regions located in rural areas. Thus, the combination of the locally unique identifier (which is unique within a region corresponding to the estimated location of the neighbor cell 40) and the estimated location of the neighbor cell (which indicates the region within which the neighbor cell 40 is located) provides a globally unique identifier that uniquely identifies the neighbor cell 40 within the positioning map. In an example embodiment, one or more regions may include neighbor cells 40 that have the same operational parameters and/or locally identifying information used to generate the locally unique identifier for the neighbor cells 40 and the neighbor cells are differentiated from one another based on clusters of neighbor cells that are commonly observed together (e.g., as identified based on a clustering algorithm and/or the like as described below).

At block 410, a positioning map comprising an instance of neighbor-cell information comprising, associated with, and/or indexed by the globally unique identifier is generated. In an example embodiment, generating the positioning map comprises creating the positioning map. In an example embodiment, generating the positioning map comprises updating the positioning map by updating an existing instance neighbor-cell information comprising, associated with, and/or indexed by the globally unique identifier or by generating an instance of neighbor-cell information comprising, associated with, and/or indexed by the globally unique identifier. For example, if a positioning map does not yet exist, the positioning map may be created. For example, if an existing positioning map comprises an instance of neighbor-cell information comprising, associated with, and/or indexed by the globally unique identifier, the instance of neighbor-cell information may be updated. For example, if an existing positioning map does not include an instance of neighbor-cell information comprising, associated with, and/or indexed by the globally unique identifier, an instance of neighbor-cell information comprising, associated with, and/or indexed by the globally unique identifier may be created and stored to the positioning map.

In an example embodiment, the instance of neighbor-cell information comprising, associated with, and/or indexed by the globally unique identifier comprises information/data regarding the neighbor cell, the approximate location of the neighbor cell and/or a more detailed location of the neighbor cell (e.g., a position of the neighbor cell within the corresponding region identified by the approximate location of the neighbor cell), a communication protocol via which the neighbor cell communicates, range of the neighbor cell, operational parameters of the neighbor cell, and/or the like. In an example embodiment, the neighbor-cell information comprising, associated with, and/or indexed by the globally unique identifier is an attribute (e.g., comprising the globally unique identifier for the neighbor cell, for example) of an instance of cellular network access point information that includes serving cell information for the corresponding cellular network access point. For example, the positioning map may comprise a single instance of information for each cellular network access point that may be identified whether the cellular network access point is interacted with by a mobile device 20 and/or computing entity 30 as a serving cell 50 or observed by the mobile device 20 and/or computing entity 30 as a neighbor cell 40.

In particular, the positioning map is generated to include only one instance of neighbor-cell information corresponding to the neighbor cell 40, in various embodiments. For example, the global uniqueness of the globally unique identifier for the neighbor cell 40 and the reproducibility of the globally unique identifier for the neighbor cell 40 based on values observable by a mobile device 20 and/or computing entity 30 enable the prevention of duplicate instances of neighbor-cell information in the positioning map.

In various embodiments, the network device 10 and/or mobile device 20 generates a positioning map comprising an instance of neighbor-cell information that provides information/data corresponding to the neighbor cell 40 and that comprises, is associated with, and/or indexed by the globally unique identifier for the neighbor cell. For example, the network device 10 and/or mobile device 20 may comprise means, such as processor 12, 22, memory 14, 24, and/or the like, for generating a positioning map comprising one and only one instance of neighbor-cell information comprising, associated with, and/or indexed by the globally unique identifier for the neighbor-cell. As should be understood, based on a plurality of instances of observation information received from one or more mobile devices 20, the positioning map may be generated to comprise a plurality of instances of neighbor-cell information that each comprise, are associated with, and/or indexed by a respective globally unique identifier and that each correspond to a unique neighbor cell 40.

In an example embodiment, and instance of observation information may include information regarding two or more neighbor cells 40 observed by the mobile device 20 at approximately and/or substantially the same time. For example, the mobile device 20 may observe a first neighbor cell 40A and an nth neighbor cell 40N at approximately and/or substantially the same time. For example, the mobile device 20 may observe the nth neighbor cell 40N within a threshold time (e.g., five minutes, three minutes, two minutes, one minute) of observing the first neighbor cell 40A. In an example embodiment, the threshold time may be determined based on motion characteristics of the mobile device 20 immediately before or when the first neighbor cell 40A and/or nth neighbor cell 40N was observed by the mobile device 20. For example, if the mobile device 20 was known to be onboard a moving vehicle immediately prior to observing the first neighbor cell 40A and/or nth neighbor cell 40N, the time threshold may be shorter than if the mobile device 20 was known to be not moving or moving at a walking speed. For example, the mobile device 20 may observe the nth neighbor cell 40N while located within a threshold distance (e.g., one kilometer, five hundred meters, two-hundred fifty meters, one hundred meters, fifty meters, and/or the like).

A clustering algorithm may be used to identify neighbor cells that are often observed at approximately and/or substantially the same time. For example, when instances of observation information captured by one or more mobile devices 20 indicate that two or more neighbor cells 40 are often observed at approximately and/or substantially the same time, the two or more neighbor cells may be determined to be located in the same region and/or near one another. For example, a clustering algorithm may be used to determine geographical clusters of neighbor cells that tend to be observed at approximately and/or substantially the same time. In various embodiments, the clustering algorithm may be a k-means clustering algorithm, mean-shift clustering, density-based spatial clustering of applications with noise (DBSCAN), expectation-maximization (EM) clustering using Gaussian mixture models (GMM), agglomerative hierarchical clustering, spectral clustering, and/or other clustering algorithm. When a geographical cluster of two or more neighbor cells 40 that tend to be observed at approximately and/or substantially the same time is identified, a cluster identifier configured to uniquely identify the geographical cluster in the positioning map may be generated, defined, and/or created. The cluster identifier may then be stored as part of the respective instances of neighbor-cell information corresponding to the two or more neighbor cells 40 determined to be in the geographical cluster.

At block 412, the positioning map is optionally used to perform one or more positioning and/or navigation-related functions. For example, the network device 10 and/or the mobile device 20 uses the positioning map comprising the instance of neighbor-cell information comprising, associated with, and/or indexed by the globally unique identifier for the neighbor cell 40 to perform one or more positioning and/or navigation-related functions. For example, the network device 10 and/or mobile device 20 may comprise means, such as processor 12, 22, memory 14, 24, user interface 18, 28, and/or the like, for using the positioning map to perform one or more positioning and/or navigation-related functions. Some non-limiting examples of positioning-related and/or navigation-related functions include localization, provision of location dependent and/or triggered information, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

At block 414, at least a portion of the positioning map is optionally provided. For example, when the mobile device 20 generates the positioning map, the mobile device 20 may provide the positioning map and/or a portion thereof such that the network device 10 and/or one or more computing entities 30 receive the positioning map and/or the portion thereof. For example, when the network device 10 generates the positioning map, the network device 10 may provide the positioning map and/or a portion thereof such that one or more mobile devices 20 and/or one or more computing entities 30 receive the positioning map and/or the portion thereof. The receiving computing device(s) may store the positioning map and/or the portion thereof, use the positioning map and/or the portion thereof to perform one or more positioning and/or navigation-related functions, and/or the like, as described in more detail with regard to FIG. 6. As noted above, due to the reduced and/or prevented duplication of neighbor-cell information, the positioning map is smaller than conventional positioning maps that enable neighbor cell-based positioning. Thus, the positioning map generated according to various embodiments may be more efficiently stored (e.g., by memory-limited devices) and/or communicated (e.g., via a bandwidth-limited network) than conventional positioning maps that enable neighbor cell-based positioning.

B. Example Use of the Positioning Map

In various embodiments, a positioning map comprising a plurality of instances of neighbor-cell information that each comprise, are associated with, and/or indexed by a respective globally unique identifier may be used to perform one or more positioning and/or navigation-related functions for a computing entity 30. Some non-limiting examples of positioning-related and/or navigation-related functions include localization, provision of location dependent and/or triggered information, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

For example, a computing entity 30 may observe one or more neighbor cells 40, generate observation information corresponding to the observation of the one or more neighbor cells 40 by the computing entity 30, and provide the observation information. The computing entity 30 and/or a network device 10 may store at least a portion of a positioning map comprising a plurality of instances of neighbor-cell information that each comprise, associated with, and/or indexed by a respective globally unique identifier. The computing entity 30 and/or the network device 10 may use the observation information and the at least a portion of the positioning map to perform one or more positioning-related and/or navigation-related functions for the computing entity 30.

FIG. 5 provides a flowchart illustrating various processes, procedures, operations, and/or the like performed by a computing entity 30 to generate and provide observation information. Starting at block 502, a computing entity 30 optionally establishes an open and/or active communication session with a cellular network access point such that that cellular network access point becomes the serving cell 50 for the computing entity 30. For example, the computing entity 30 may comprise means, such as processor 32, memory 34, communications interface 36, sensors 39, and/or the like, for establishing an open and/or active communication session with a serving cell 50.

At block 504, the computing entity 30 observes one or more neighbor cells 40 and generates corresponding observation information. For example, the computing entity 30 may comprise means, such as processor 32, memory 34, communications interface 36, sensors 39, and/or the like for observing one or more neighbor cells 40 and generating corresponding observation information. For example, the computing entity 30 may observe a signal generated and/or transmitted by a neighbor cell 40. The computing entity 30 determines locally identifying information for the neighbor cell 40 based on the computing entity's 30 observation of the signal generated and/or transmitted by the neighbor cell 40. For example, based on the observation of the signal generated and/or transmitted by the neighbor cell 40, the computing entity 30 determines one or more operational parameters of the neighbor cell 40, in an example embodiment.

For example, when the neighbor cell is configured to communicate via long-term evolution (LTE) wireless broadband communications and the determined operational parameters include physical cell ID (PCI) and E-UTRA Absolute Radio Frequency Channel Number (EARFCN) values for the neighbor cell. For example, when the neighbor cell is configured to communicate via Wideband Code Division Multiple Access (WCDMA) wireless broadband communications, the determined operational parameters include primary scrambling code (PSC) and UTRA Absolute Radio Frequency Channel Number (UARFCN) values for the neighbor cell. For example, when the neighbor cell is configured to communicate via global system for mobile communications (GSM) wireless broadband communications, the determined operational parameters include base station identity code (BSIC) and Absolute Radio Frequency Channel Number (ARFCN) values for the neighbor cell. For example, when the neighbor cell is configured to communicate via 5G wireless broadband communications, the determined operational parameters include PCI and New Radio Absolute Radio Frequency Channel Number (NR-ARFCN) values for the neighbor cell. Various other observable operational parameters may be used for various other cellular communication protocols in various embodiments, as appropriate for the application.

In various embodiments, the observation information includes the determined operational parameters for the neighbor cell and/or other observable locally identifying information for the neighbor cell. In various embodiments, the observation information further includes an indication of an estimated location of the neighbor cell 40. For example, the observation information may include and/or be determined based on an approximate location of the computing entity 30 when the computing entity 30 observed the neighbor cell. For example, the approximate location of the computing entity 30 may be and/or may be determined based on a globally unique identifier for a serving cell 50 in communication with the computing entity 30 when the computing entity 30 observed the neighbor cell; a GNSS-based position estimate of the computing entity 30 corresponding to when the computing entity 30 observed the neighbor cell; a radio map-based position estimate of the computing entity 30 corresponding to when the computing entity 30 observed the neighbor cell; and/or the like.

For example, when the computing entity 30 is in communication with a particular serving cell 50 when the computing entity 30 observes a particular neighbor cell 40, it may be determined that the particular neighbor cell 40 is located in the same region as the particular serving cell 50 (e.g., same geopolitical region; same region defined by rounded, estimated, and/or truncated latitude and longitude values; and/or other region designator). For example, when a position estimate was determined for the computing entity 30 using a GNSS location sensor 39 of the computing entity 30 within a period of time (e.g., ten minutes, five minutes, two minutes, one minute) prior to and/or when the computing entity 30 observes a particular neighbor cell 40, it may be determined that the particular neighbor cell 40 is located within the same region as the computing entity 30 as indicated by the GNSS-based position estimate for the computing entity 30. For example, when a position estimate was determined for the computing entity 30 using a radio map and one or more radio interfaces of sensors 39 of the computing entity 30 within a period of time (e.g., ten minutes, five minutes, two minutes, one minute) prior to and/or when the computing entity 30 observes a particular neighbor cell 40, it may be determined that the particular neighbor cell 40 is located within the same region as the computing entity 30 as indicated by the radio map-based position estimate for the computing entity 30. In various embodiments, the length of the period of time prior to the observation of the particular neighbor cell 40 for which such a GNSS-based or radio map-based position estimate of the computing entity 30 is deemed usable and/or appropriate for determining an estimated location of the particular neighbor cell 40 may be determined based on motion characteristics of the computing entity 30 immediately before or when the particular neighbor cell 40 was observed by the computing entity 30. For example, if the computing entity 30 was known to be onboard a moving vehicle immediately prior to observing the particular neighbor cell 40, the period of time may be shorter than if the computing entity 30 was known to be not moving or moving at a walking speed.

At block 506, the computing entity 30 provides the observation information. For example, in various embodiments, the computing entity 30 provides and/or passes the observation information to processor 32 (e.g., as input to a positioning application operating on the computing entity 30) and/or transmits the observation information (e.g., via server cell 50, one or more wired and/or wireless networks 60, and/or the like) such that a network device 10 receives the observation information. For example, the computing entity 30 may comprise means, such as processor 32, memory 34, communications interface 36, and/or the like, for providing the observation information.

At block 508, the computing entity 30 receives the position estimate generated and/or determined based on the positioning map comprising a plurality of instances of neighbor-cell information that each comprise, are associated with, and/or indexed by a respective globally unique identifier. For example, the computing entity 30 may receive a position estimate provided (e.g., transmitted) by the network device 10. For example, the positioning application operating on the computing entity 30 may provide the position estimate to a positioning and/or navigation-related application operating on the computing entity 30. For example, the computing entity may comprise means, such as processor 32, memory 34, communications interface 36, and/or the like, for receiving the position estimate generated and/or determined based on the positioning map comprising a plurality of instances of neighbor-cell information that each comprise, are associated with, and/or indexed by a respective globally unique identifier.

At block 510, the computing entity 30 uses the position estimate to perform one or more positioning and/or navigation-related functions. For example, the computing entity 30 may comprise means, such as processor 32, memory 34, user interface 38, and/or the like, for using the position estimate to perform one or more positioning and/or navigation-related functions. Some non-limiting examples of positioning-related and/or navigation-related functions include localization, provision of location dependent and/or triggered information, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

FIG. 6 provides a flowchart illustrating various processes, procedures, operations, and/or the like for using a positioning map comprising a plurality of instances of neighbor-cell information that each comprising, are associated with, and/or indexed by a respective globally unique identifier for determining a position estimate for a computing entity 30 based on one or more neighbor cells observed by the computing entity 30. In various embodiments, the various processes, procedures, operations, and/or the like shown in FIG. 6 are performed by the network device 10 and/or computing entity 30.

Starting at block 602, observation information corresponding to an observation of a neighbor cell 40 by a computing entity 30 is obtained. For example, the network device 10 receives observation information received that was provided (e.g., transmitted) by the computing entity 30. The network device 10 processes the observation information (e.g., provide the observation information to processor 12 and/or a positioning application being executed by the processor 12) responsive to receiving the observation information, in an example embodiment. In an example embodiment, the network device 10 stores the received observation information in memory 14 and access the observation information at a later time for processing (e.g., providing to processor 12 and/or a positioning application being executed by the processor 12). For example, the network device 10 may comprise means, such as processor 12, memory 14, communication interface 16, and/or the like for obtaining observation information generated by a computing entity 30.

For example, the computing entity 30 may access observation information stored in memory 24 and provide the observation information to a positioning application being executed by the processor 32. For example, the computing entity 30 may comprise means, such as processor 32, memory 34, and/or the like, for obtaining observation information.

At block 604, one or more instances of neighbor-cell information comprising, associated with, and/or indexed by globally unique identifiers comprising locally unique identifiers that match the observed locally unique identifier for the neighbor cell 40 observed by the computing entity 30 are identified from the positioning map. For example, the network device 10 and/or computing entity 30 identifies one or more instance of neighbor-cell information comprising, associated with, and/or indexed by globally unique identifiers comprising locally unique identifiers that match the observed locally unique identifier for the neighbor cell 40 observed by the computing entity 30. For example, the network device 10 and/or computing entity 30 may comprise means, such as processor 12, 32, memory 14, 34, and/or the like for identifying one or more instances of neighbor-cell information comprising, associated with, and/or indexed by globally unique identifiers comprising locally unique identifiers that match the observed locally unique identifier for the neighbor cell 40 observed by the computing entity 30. For example, the positioning map may be queried using the observed locally unique identifier provided by and/or determined based on the observation information to identify instances of neighbor-cell information comprising, associated with, and/or indexed by globally unique identifiers comprising locally unique identifiers that match the observed locally unique identifier for the neighbor cell 40 observed by the computing entity 30.

At block 606, the one or more instances of neighbor-cell information identified as comprising, being associated with, and/or indexed by a globally unique identifier comprising a locally unique identifier that matches the observed locally unique identifier for the neighbor cell 40 observed by the computing entity 30 (also referred to herein as the identified one or more instances of neighbor-cell information) are optionally filtered. In various embodiments, the network device 10 and/or computing entity 30 filters the identified one or more instances of neighbor-cell information. For example, the network device 10 and/or computing entity 30 may comprise means, such as processor 12, 32, memory 14, 34, and/or the like, for filtering the identified one or more instances of neighbor-cell information. In various embodiments, the identified one or more instances of neighbor-cell information are filtered based on the respective estimated locations corresponding to identified one or more instances of neighbor-cell information.

For example, the observation information may include an indication of an approximate location of the computing entity 30 when the computing entity 30 observed the neighbor cell 40. For example, the indication of the approximate location of the computing entity 30 provided by the observation information may be and/or may be determined based on a globally unique identifier for a serving cell 50 in communication with the computing entity 30 when the computing entity observed the neighbor cell; a GNSS-based position estimate of the computing entity 30 corresponding to when the computing entity observed the neighbor cell 40; a radio map-based position estimate of the computing entity 30 corresponding to when the computing entity 30 observed the neighbor cell 40; and/or the like. The identified one or more instances of neighbor-cell information are filtered to only include instances of neighbor-cell information that do satisfy a distance criteria with respect to the approximate location of the computing entity 30. For example, when an instance of neighbor-cell information of the identified one or more instances of neighbor-cell information is associated with and/or comprises an estimated location of the respective neighbor cell 40 that is more than a particular distance (e.g., 100 kilometers, 80 kilometers, 70 kilometers, 60 kilometers, 50 kilometers, and/or the like) from the approximate location of the computing entity 30 when the computing entity 30 observed the observed neighbor cell 40, the instance of neighbor-cell information may be filtered out and/or removed from the identified one or more instances of neighbor-cell information. For example, when an instance of neighbor-cell information of the identified one or more instances of neighbor-cell information is associated with and/or comprises an estimated location of the respective neighbor cell 40 that is within and/or less than a particular distance (e.g., 100 kilometers, 80 kilometers, 70 kilometers, 60 kilometers, 50 kilometers, and/or the like) from the approximate location of the computing entity 30 when the computing entity 30 observed the observed neighbor cell 40, the instance of neighbor-cell information remain in the identified one or more instances of neighbor-cell information.

At block 608, optionally a clustering algorithm may be used to identify geographical clusters of neighbor cells that each comprise at least one neighbor cell associated with and/or corresponding to a globally unique identifier corresponding to an instance of neighbor-cell information that is included in the identified one or more instances of neighbor-cell information. For example, in various embodiments, an instance of neighbor-cell information may comprise a cluster identifier configured to identify a geographical cluster of which the corresponding neighbor cell has been determined to be a part. The observation information may include two or more observed locally unique identifiers and/or information/data that may be used to determine two or more observed locally unique identifiers. For example, for each observed locally unique identifier provided in and/or determined based on the observation information, instances of neighbor-cell information matching the observed locally unique identifier may be identified, possibly filtered, and/or the like to provide multiple sets of identified one or more instances of neighbor-cell information where each set comprises the (possibly filtered) instances of neighbor-cell information corresponding to respective globally unique identifiers comprising locally unique identifiers that match one of the observed locally unique identifiers. It may then be determined if members from different sets of the multiple sets of identified one or more instances of neighbor-cell information are associated with the same geographical cluster (e.g., based on respective cluster identifiers stored as part of the respective instances of neighbor-cell information). When members from different sets of the multiple sets of identified one or more instances of neighbor-cell information are associated with the same geographical cluster, it may be determined that those members of the different sets of the multiple sets of identified one or more instances of neighbor-cell information are more likely to correspond to the neighbor cells 40 observed by the computing entity 30.

For example, the instance of neighbor-cell information corresponding to neighbor cell A from a first set of the multiple sets of identified one or more instances of neighbor-cell information may comprise a cluster identifier corresponding to geographical cluster X. The instance of neighbor-cell information corresponding to neighbor-cell B from a second set of the multiple sets of identified one or more instances of neighbor-cell information may comprise a cluster identifier corresponding to geographical cluster X. The instance of neighbor-cell information corresponding to neighbor cell C from a first set of the multiple sets of identified one or more instances of neighbor-cell information may comprise a cluster identifier corresponding to geographical cluster Y. However, none of the instances of neighbor-cell information of the second set of multiple sets of identified one or more instances of neighbor-cell information may comprise a cluster identifier corresponding to geographical cluster Y. It may therefore be determined that it is more likely that the computing entity 30 observed neighbor cell A and neighbor cell B than neighbor cell C.

In various embodiments, the instances of neighbor-cell information may not include and/or be associated with cluster identifiers and a clustering algorithm may be used identify geographical clusters of neighbor cells as part of determining the position estimate for the computing entity 30 based on the obtained observation information. For example, a clustering algorithm may be used to identify neighbor cells that may be observed at approximately and/or substantially the same time. For example, when instances of neighbor-cell information comprise estimated locations indicating that two or more neighbor cells 40 are expected to be observed at approximately and/or substantially the same time (e.g., the two or more neighbor cells may be located in the same region and/or near one another), the two or more neighbor cells may be determined to comprise a geographical cluster. For example, a clustering algorithm may be used to determine geographical clusters of neighbor cells that are expected to be observed at approximately and/or substantially the same time. In various embodiments, the clustering algorithm may be a k-means clustering algorithm, mean-shift clustering, density-based spatial clustering of applications with noise (DBSCAN), expectation-maximization (EM) clustering using Gaussian mixture models (GMM), agglomerative hierarchical clustering, spectral clustering, and/or other clustering algorithm.

For example, the network device 10 and/or computing entity 30 uses a clustering algorithm and/or cluster identifiers of the instances of neighbor-cell information of multiples sets of identified one or more instances of neighbor-cell information to determine groups of instances of neighbor-cell information having at most one member from each of the multiple sets of identified one or more instances of neighbor-cell information. The more members a group of instances of neighbor-cell information comprises, the more likely the group comprises the instances of neighbor-cell information that correspond to the neighbor cells 40 observed by the computing entity 30 as indicated by the obtained observation information. For example, the network device 10 and/or computing entity 30 may comprise means, such as processor 12, 32, memory 14, 34, and/or the like for using a clustering algorithm and/or cluster identifiers of the instances of neighbor-cell information of multiples sets of identified one or more instances of neighbor-cell information to determine groups of instances of neighbor-cell information having at most one member from each of the multiple sets of identified one or more instances of neighbor-cell information.

At block 610, a particular instance of neighbor-cell information of the identified one or more instances of neighbor-cell information is identified based at least on a respective indication of the estimated location within the respective globally unique identifier of the particular instance of neighbor-cell information. In scenarios where multiple sets of identified one or more instances neighbor-cell information were identified (e.g., at block 604), a particular instance of neighbor-cell information may be identified from each set of the multiple sets based at least on a respective indication of the estimated location within the respective globally unique identifier of the particular instance of neighbor-cell information. In various embodiments, the particular instance(s) of neighbor-cell information are identified from the (multiple sets of) identified one or more instances of neighbor-cell information based on the approximate location of the computing entity 30 when the observed neighbor cell(s) were observed by the computing entity 30, the estimated location of and/or encoded in the globally unique identifier of the particular instance(s) of neighbor-cell information, identified geographical clusters of neighbor cells, and/or the like.

For example, the network device 10 and/or the computing entity 30 identifies particular instance(s) of neighbor-cell information from the (multiple sets of) the identified one or more instances of neighbor-cell information based at least on a respective indication of the estimated location within the respective globally unique identifier of the particular instance of neighbor-cell information. For example, the network device 10 and/or computing entity 30 comprises means, such as processor 12, 32, memory 14, 34, and/or the like, for identifying particular instance(s) of neighbor-cell information from the (multiple sets of) the identified one or more instances of neighbor-cell information based at least on a respective indication of the estimated location within the respective globally unique identifier of the particular instance of neighbor-cell information. The particular instance(s) of neighbor-cell information are determined to correspond to and/or be associated with the neighbor cell(s) observed by the computing entity 30 as indicated by the obtained observation information.

At block 612, a position estimate is determined based at least in part on the identified particular instance(s) of neighbor-cell information determined to be associated with and/or to correspond to the observed neighbor cell(s). For example, the network device 10 and/or computing entity 30 determines a position estimate for the computing entity 30 based at least in part on the identified particular instance(s) of neighbor-cell information determined to be associated with and/or correspond to the observed neighbor cell(s). For example, the network device 10 and/or computing entity 30 comprise means, such as processor 12, 32, memory 14, 34, and/or the like, for determining a position estimate for the computing entity 30 based at least in part on the identified particular instance(s) of neighbor-cell information determined to be associated with and/or correspond to the observed neighbor cell(s). For example, the position estimate may be determined based at least in part on the approximate location(s) of the neighbor-cell information and/or included in the globally unique identifier comprising, associated with, and/or that indexes the identified particular instance(s) of neighbor-cell information. In various embodiments, the position estimate may indicate a region where the computing entity 30 was located when the computing entity observed the neighbor cell(s) 40, a set of latitude and longitude values, a position along a traversable map element of a traversable road/path network, and/or the like.

At block 614, the positioning estimate is optionally used to perform one or more positioning and/or navigation-related functions. For example, the network device 10 and/or the computing entity 30 uses the position estimate to perform one or more positioning and/or navigation-related functions. For example, the network device 10 and/or computing entity 30 may comprise means, such as processor 12, 32, memory 14, 34, user interface 18, 38, and/or the like, for using the position estimate to perform one or more positioning and/or navigation-related functions. For example, the position estimate may be provided as input to an algorithm, process, application, and/or the like configured to perform one or more positioning and/or navigation-related functions. Some non-limiting examples of positioning-related and/or navigation-related functions include localization, provision of location dependent and/or triggered information, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

At block 616, the position estimate and/or a result of performing a positioning and/or navigation-related function based at least in part on the position estimate is optionally provided. For example, when the network device 10 determines the position estimate, the network device 10 may provide the position estimate and/or a result of performing a positioning and/or navigation-related function such that the computing entity 30 receives the position estimate and/or a result of performing a positioning and/or navigation-related function. The computing entity 30 may provide (e.g., display) the position estimate and/or a result of performing a positioning and/or navigation-related function based at least in part on the position estimate via a user interface 38 of the computing entity 30. The computing entity 30 may provide (e.g., transmit) the position estimate such that a network device 10 receives the position estimate for use in determining current traffic conditions, for performing one or more positioning and/or navigation-related functions, and/or the like. For example, the network device 10 and/or computing entity 30 may comprise means, such as processor 12, 32, memory 14, 34, communication interface 16, 36, user interface 18, 38, and/or the like, for providing the position estimate.

III. Technical Advantages

Various embodiments provide technical solutions to the technical problems of generating and/or using a positioning map that enables neighbor cell-based positioning and that does not include a significant amount of redundant information. For example, the global uniqueness of the globally unique identifier for a neighbor cell 40 and the reproducibility of the globally unique identifier for the neighbor cell 40 based on values observable by a mobile device 20 and/or computing entity 30 enable the prevention of duplicate instances of neighbor-cell information in the positioning map. Thus, storage of redundant neighbor-cell information in the positioning map may be reduced and/or prevented such that the positioning map is smaller in size than conventional positioning maps that enable neighbor cell-based positioning. The smaller size of positioning maps comprising instances of neighbor-cell information that are each comprising, associated with, and/or indexed by a respective globally unique identifier enables more efficient storage of the positioning map and/or portions thereof by memory-limited devices. Moreover, the smaller size of positioning maps comprising instances of neighbor-cell information that are each comprising, associated with, and/or indexed by a respective globally unique identifier enables more efficient transmission of the positioning map and/or portions thereof via bandwidth-limited networks. However, the increase in storage and transmission efficiency does not reduce the accuracy of position estimates determined using the positioning map comprising instances of neighbor-cell information that are each comprising, associated with, and/or indexed by a respective globally unique identifier. Thus, various embodiments provide technical improvements to the operation of network devices 10, mobile devices 20, and/or computing entities 30.

IV. Example Apparatus

The network device 10, mobile device 20, and/or computing entity 30 of an example embodiment may be embodied by or associated with a variety of computing devices including, for example, a navigation system including a global navigation satellite system (GNSS), a cellular telephone, a mobile phone, a personal digital assistant (PDA), a watch, a camera, a computer, an Internet of things (IoT) item, and/or other device that can observe the radio environment (e.g., the cellular radio environment) in the vicinity of the computing device and/or that can store at least a portion of a positioning map. Additionally or alternatively, the network device 10, mobile device 20, and/or computing entity 30 may be embodied in other types of computing devices, such as a server, a personal computer, a computer workstation, a laptop computer, a plurality of networked computing devices or the like, that are configured to observe neighbor cells 40, generate and provide observation information corresponding to observations of neighbor cells, determine locally unique identifiers and/or estimated locations of neighbor cells, define globally unique identifiers for neighbor cells, generate a positioning map comprising an instance of neighbor-cell information that is comprising, associated with, and/or indexed by a globally unique identifier for the neighbor cell 40, use the positioning map to determine a position estimate based on observation information, and/or the like. In an example embodiment, a mobile device 20 and/or computing entity 30 is a smartphone, tablet, laptop, navigation device, and/or other mobile computing device and a network device 10 is a server that may be part of a Cloud-based processing system.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10, mobile device 20, and/or computing device 30 may be embodied by a computing entity and/or device. However, in some embodiments, the network device 10, mobile device 20 and/or computing device 30 may be embodied as a chip or chip set. In other words, the network device 10, mobile device 20, and/or computing entity 30 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22. 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10, mobile device 20, and/or computing entity 30 may include a user interface 18, 28, 38 that may, in turn, be in communication with the processor 12, 22, 32 to provide output to the user, such as one or more navigable routes to a destination location and/or from an origin location, display of location dependent and/or triggered information, and/or the like, and, in some embodiments, to receive an indication of a user input. As such, the user interface 18, 28, 38 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network device 10, mobile device 20, and/or computing entity 30 may optionally include a communication interface 16, 26, 36. The communication interface 16, 26, 36 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, a network device 10, mobile device 20, and/or computing entity 30 may comprise a component (e.g., memory 14, 24, 34, and/or another component) that stores a digital map (e.g., in the form of a geographic database) comprising a first plurality of data records, each of the first plurality of data records representing a corresponding TME, wherein at least some of said first plurality of data records map information/data indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, the geographic database may comprise a positioning map comprising instances of neighbor-cell information that are each comprising, associated with, and/or indexed by a respective globally unique identifier. For example, a geographic database may include road segment, segment, link, lane segment, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network device 10 may be configured to modify, update, and/or the like one or more data records of the geographic database. For example, the network device 10 may modify, update, generate, and/or the like map information/data corresponding to TMEs, links, lanes, road segments, travel lanes of road segments, nodes, intersection, pedestrian walkways, elevators, staircases, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, paths, navigable aerial route segments, and/or the like as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example. Alternatively and/or additionally, the geographic database can contain navigable aerial route segments or nodes and connection information/data or other data that represent an navigable aerial network, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a network device 10, mobile devices 20, and/or computing entity 30 in accordance with an example embodiment may generate the databases (e.g., a positioning map) comprising instances of neighbor-cell information that are each comprising, associated with, and/or indexed by a respective globally unique identifier and/or use the databases (e.g., the positioning map) to perform one or more positioning and/or navigation-related functions.

V. Apparatus, Methods, and Computer Program Products

As described above, FIGS. 3, 4, 5, and 6 illustrate flowcharts of a network device 10, mobile device 20, and/or computing entity 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
obtaining, by a processor, an observed locally unique identifier for an observed neighbor cell, wherein the processor has access to at least a portion of a positioning map that comprises a plurality of instances of neighbor-cell information, wherein each instance of neighbor-cell information comprises a respective globally unique identifier configured to uniquely identify a corresponding neighbor cell in the positioning map, the respective globally unique identifier comprising a respective locally unique identifier of the corresponding neighbor cell and a respective indication of a respective estimated location of the corresponding neighbor cell;
identifying, by the processor, a particular instance of neighbor-cell information that is associated with the observed neighbor cell, the particular instance of neighbor-cell information identified from among the plurality of instances of neighbor-cell information within the at least a portion of the positioning map, wherein identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance; and determining, by the processor, a position estimate based at least in part on the identified particular instance of neighbor-cell information that is associated with the observed neighbor cell.

2. The method of claim 1, wherein the position estimate is determined for a computing entity that observed the observed neighbor cell.

3. The method of claim 2, wherein an indication of an approximate location of the computing entity corresponding to a time at which the computing entity observed the observed neighbor cell is obtained by the processor, and the method further comprises filtering one or more globally unique identifiers comprising locally unique identifiers that match the observed locally unique identifier based on estimated locations associated with the one or more globally unique identifiers and the approximate location of the computing entity, wherein the identifying of the globally unique identifier is performed after the filtering of the one or more globally unique identifiers comprising locally unique identifiers that match the observed locally unique identifier.

4. The method of claim 3, wherein the indication of the approximate location of the computing entity is determined based at least in part on at least one of:
   a globally unique identifier for a serving cell in communication with the computing entity when the computing entity observed the observed neighbor cell;
   a global navigation satellite system (GNSS)-based (GNSS-based) position estimate of the computing entity corresponding to when the computing entity observed the observed neighbor cell; or
   a radio map-based position estimate of the computing entity corresponding to when the computing entity observed the observed neighbor cell.

5. The method of claim 1, wherein the observed locally unique identifier for the observed neighbor cell comprises operational parameters of the observed neighbor cell.

6. The method of claim 5, wherein at least one of:
   the observed neighbor cell is configured to communicate via long-term evolution (LTE) wireless broadband communications and the locally unique identifier for the observed neighbor cell comprises physical cell ID (PCI) and E-UTRA Absolute Radio Frequency Channel Number (EARFCN) values for the observed neighbor cell;
   the observed neighbor cell is configured to communicate via Wideband Code Division Multiple Access (WCDMA) wireless broadband communications and the locally unique identifier for the observed neighbor cell comprises primary scrambling code (PSC) and UTRA Absolute Radio Frequency Channel Number (UARFCN) values for the observed neighbor cell;
   the observed neighbor cell is configured to communicate via global system for mobile communications (GSM) wireless broadband communications and the locally unique identifier for the observed neighbor cell comprises base station identity code (B SIC) and Absolute Radio Frequency Channel Number (ARFCN) values for the observed neighbor cell; or
   the observed neighbor cell is configured to communicate via 5G wireless broadband communications and the locally unique identifier for the observed neighbor cell comprises PCI and New Radio Absolute Radio Frequency Channel Number (NR-ARFCN) values for the observed neighbor cell.

7. The method of claim 1, wherein the plurality of instances of neighbor-cell information each correspond to a unique neighbor cell.

8. The method of claim 1, wherein identifying the particular instance of neighbor-cell information comprises using a clustering algorithm to identify geographically-related clusters of neighbor cells based on the approximate locations of the neighbor cells associated with corresponding globally unique identifiers.

9. An apparatus comprising at least one processor, at least one memory storing computer program code, and a communications interface, the at least one memory and the computer program code configured to, with the processor, cause the apparatus to at least:
   obtain an observed locally unique identifier for an observed neighbor cell, wherein the processor has access to at least a portion of a positioning map that comprises a plurality of instances of neighbor-cell information, wherein each instance of neighbor-cell information comprises a respective globally unique identifier configured to uniquely identify a corresponding neighbor cell in the positioning map, the respective globally unique identifier comprising a respective locally unique identifier of the corresponding neighbor cell and a respective indication of a respective estimated location of the corresponding neighbor cell;
   identify a particular instance of neighbor-cell information that is associated with the observed neighbor cell, the particular instance of neighbor-cell information identified from among the plurality of instances of neighbor-cell information within the at least a portion of the positioning map, wherein identifying the particular instance is based on (a) the respective globally unique identifier of the particular instance comprising a respective locally unique identifier that matches the observed locally unique identifier for the observed neighbor cell, and (b) the respective indication of the estimated location within the respective globally unique identifier of the particular instance; and
   determine a position estimate based at least in part on the identified particular instance of neighbor-cell information that is associated with the observed neighbor cell.

* * * * *